US010819386B1

(12) United States Patent
Barnawi

(10) Patent No.: US 10,819,386 B1
(45) Date of Patent: Oct. 27, 2020

(54) COHERENT DETECTION OF OVERLAPPING CHIRP SYMBOLS TO INCREASE THE DATA RATE OF CHIRP SPREAD SPECTRUM (CSS) COMMUNICATION METHOD AND SYSTEM

(71) Applicant: King Abdulaziz University, Jeddah (SA)

(72) Inventor: Ahmed Barnawi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/940,872

(22) Filed: Jul. 28, 2020

(51) Int. Cl.
*H04B 1/69* (2011.01)
*H04B 1/692* (2011.01)
*H04B 1/707* (2011.01)
*H04L 27/10* (2006.01)
*H04B 1/713* (2011.01)

(52) U.S. Cl.
CPC ............ *H04B 1/692* (2013.01); *H04B 1/707* (2013.01); *H04B 1/713* (2013.01); *H04L 27/103* (2013.01); *H04B 2001/6912* (2013.01)

(58) Field of Classification Search
CPC ........ H04B 1/692; H04B 1/707; H04B 1/713; H04B 2001/6912; H04B 27/103
See application file for complete search history.

(56) References Cited

U.S. PATENT DOCUMENTS

| 4,581,715 | A | 4/1986 | Hyatt | |
|---|---|---|---|---|
| 7,391,550 | B2 | 6/2008 | Harris et al. | |
| 10,530,628 | B1 * | 1/2020 | Yoo | H04L 5/0055 |
| 2008/0310479 | A1 | 12/2008 | Koslar et al. | |
| 2012/0294333 | A1 | 11/2012 | Barnawi | |
| 2012/0314730 | A1 | 12/2012 | McCorkle et al. | |
| 2013/0129026 | A1 | 5/2013 | Petersen | |

FOREIGN PATENT DOCUMENTS

| CN | 1653709 A | 8/2005 |
|---|---|---|
| EP | 1 099 957 A1 | 5/2001 |

OTHER PUBLICATIONS

Andreas Springer, et al., "Spread Spectrum Communications Using Chirp Signals", IEEE/AFCEA EUROCOMM 2000, Information Systems for Enhanced Public Safety and Security (CAT. No. 00EX405), May 19, 2000, pp. 1-6.
"LM741 Operational Amplifier", Texas Instruments Incorporated, www.ti.com, SNOSC25D, May 1998—Revised Oct. 2015, pp. 1-16.

* cited by examiner

*Primary Examiner* — David S Huang
(74) *Attorney, Agent, or Firm* — Oblon, McClelland, Maier & Neustadt, L.L.P.

(57) ABSTRACT

A system and methods for transmission and coherent detection of data signals modulated by a plurality of overlapping chirps in a chirp spread spectrum communication system (CSS). Data signals input to an adaptive overlapping transmitter are modulated by a plurality of overlapping chirps and transmitted over a wireless communication system to a coherent receiver. The coherent receiver includes a chirp matched filter which detects the chirps, a fast Fourier transform which converts the received chirps to the frequency domain, a plurality of bandpass filters which separate the transformed chirps by frequency band, and bank of integrators which sums the amplitudes of the chirps in each frequency band, and decision circuitry which matches the amplitudes to reference values and iteratively decodes the bit sequences of to recover the data signals.

20 Claims, 21 Drawing Sheets

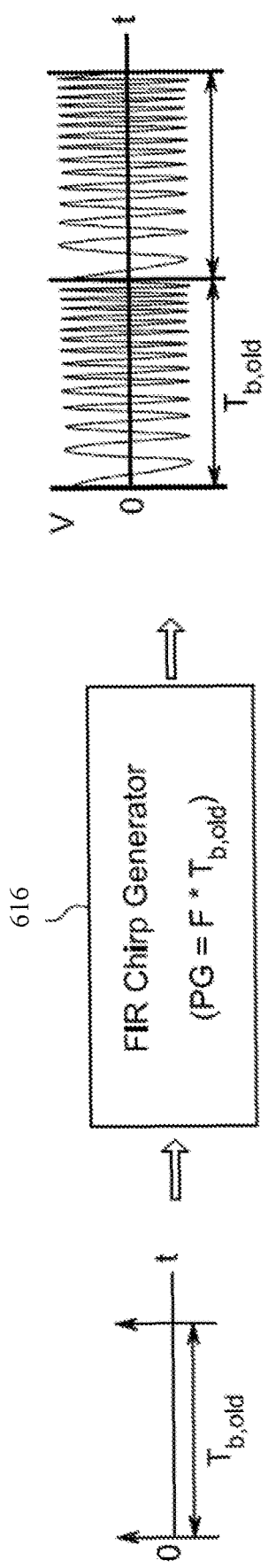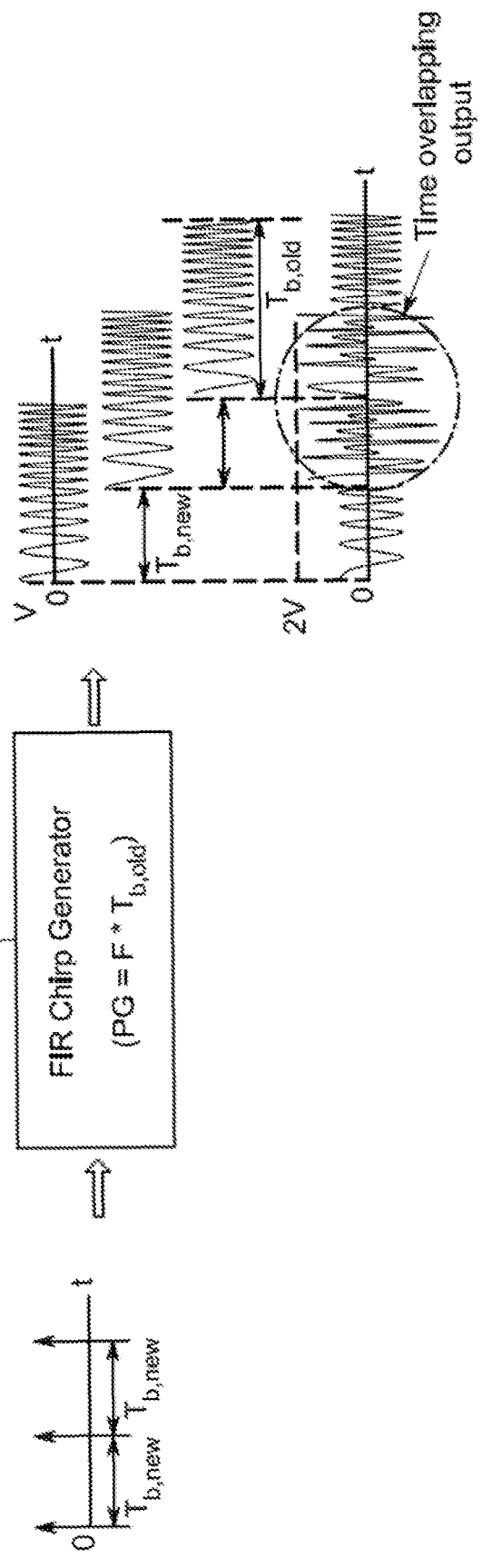
FIG. 9A
FIG. 9B

COHERENT DETECTION OF OVERLAPPING CHIRP SYMBOLS TO INCREASE THE DATA RATE OF CHIRP SPREAD SPECTRUM (CSS) COMMUNICATION METHOD AND SYSTEM

CROSS-REFERENCE TO RELATED APPLICATIONS

U.S. Patent Application titled "A Method And Apparatus For Non-Coherent Detection Of Overlapped Chirp Signal To Increase Data Rate Of A Chirp Spread", Ser. No. 16/983,575 which names inventors in common with the inventors of the present disclosure, is incorporated herein by reference in its entirety.

BACKGROUND

Technical Field

The present disclosure is directed to a method, system and apparatus for coherent detection of an overlapped chirp signal in a chirp spread spectrum communication system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Chirp communications are typically used in low cost, battery powered systems operating using low data rates and short messages, often in noisy environments or over long distances. As a result of these conditions, interference, such as multipath interference, reduces the accuracy of decoding the communications. Thus, a method for transmitting more data within a given bandwidth and a means to remove interference is desired.

Modulating the data signals with overlapping chirps has the benefit of increasing the data rate of the transmission of the data. A coherent receiver must be capable of decoding the encoded signals and removing noise and multipath distortions.

Accordingly, it is one object of the present disclosure to provide a system and methods for transmitting data signals encoded with overlapped chirp signals and for coherently receiving and decoding the data signals.

SUMMARY

In an exemplary embodiment, a system for coherent transmission and detection of data signals modulated by a plurality of overlapping chirps in a chirp spread spectrum communication system (CSS) is described, comprising an adaptive overlapping transmitter configured to receive a stream of data signals at a first data rate, the adaptive overlapping transmitter including a data rate generator configured to increase the first data rate ($R_{old}$) of the data signals to a second data rate ($R_{new}$), an antipodal pulse converter connected in series to the data rate generator and configured to convert the data signals to positive and negative pulses, a finite impulse response (FIR) chirp generator connected in series to the antipodal pulse converter and configured to generate chirp signals from the positive and negative pulses, an amplifier connected in series to the FIR chirp generator and configured to increase the gain of the chirp signals and output a chirp modulated stream of data signals, a wireless transmission circuit connected in series to the amplifier and configured to add three positive pulses to the chirp modulated stream of data signals to generate an encoded stream of data signals and transmit the encoded stream, a coherent receiver configured to receive the encoded stream, the coherent receiver comprising a coherent chirp matched filter configured to convolve the encoded stream of data signals with an inverted chirp signal, determine a phase and a frequency of the data signal and generate a chirp matched signal, a fast Fourier transform circuit connected in series with the coherent chirp matched filter and configured to transform the chirp matched signal to a frequency domain, a plurality of parallel bandpass filters connected to the Fourier transform circuit, each having a discrete frequency range and each configured to output a plurality of filtered signals in the respective discrete frequency range, a bank of parallel integrators, wherein each integrator is operatively connected to one of the plurality of bandpass filters and configured to sum the amplitudes of the plurality of filtered signals in the discrete frequency range, a decision circuit operatively connected to the bank of integrators and configured to match the sum of the amplitudes of the plurality of filtered signals in the discrete frequency range to a reference value to decode the encoded stream.

In another exemplary embodiment, a method for coherent detection of an encoded stream of data signals modulated by a plurality of overlapping chirps in a chirp spread spectrum communication system (CSS) is described, the method comprising receiving, by a coherent chirp matched filter, the encoded stream of data signals, wherein the data signal comprises a first number of bits having values of either +1 or −1, generating an inverted chirp signal, convolving the encoded stream of data signals with the inverted chirp signal to determine phase and frequency of the data signal and to generate a chirp matched signal, fast Fourier transforming the chirp matched signal to generate a fast Fourier transformed signal, filtering, by a plurality of bandpass filters, the fast Fourier transformed signal, wherein each filter has a discrete frequency range, to generate a plurality of filtered signals in the respective discrete frequency range, integrating each of the plurality of filtered signals by a one of a plurality of integrators to output a sum of the amplitudes of the plurality of filtered signals in the discrete frequency range, decoding, by a decision circuit, each of the plurality of integrated signals to detect a bit sequence of the encoded stream of data signals.

In another exemplary embodiment, a method for transmitting an encoded stream of data signals modulated by a plurality of overlapping chirps in a chirp spread spectrum communication system (CSS) is described, comprising receiving a stream of data signals at a first data rate ($R_{old}$), increasing the first data rate of the data signals to a second data rate ($R_{new}$), converting the data signals to positive and negative pulses, generating chirp signals from the positive and negative pulses, increasing the gain of the chirp signals by a factor equal to the ratio of the second data rate divided by the first data rate, outputting a chirp modulated stream of data signals, adding three positive pulses to the chirp modulated stream of data signals to generate an encoded stream of data signals, and transmitting the encoded stream in the chirp spread spectrum communications system.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9A is a block diagram depicting the coherent chirp matched filter.

FIG. 9B illustrates the output of the FIR Chirp generator impulsed by antipodal pulses in which there is no overlapping in the consecutive bits in the CSS transmission transmitted at the rate of $R_{old}$=1/$T_{b,old}$.

DETAILED DESCRIPTION

Figure 1A:
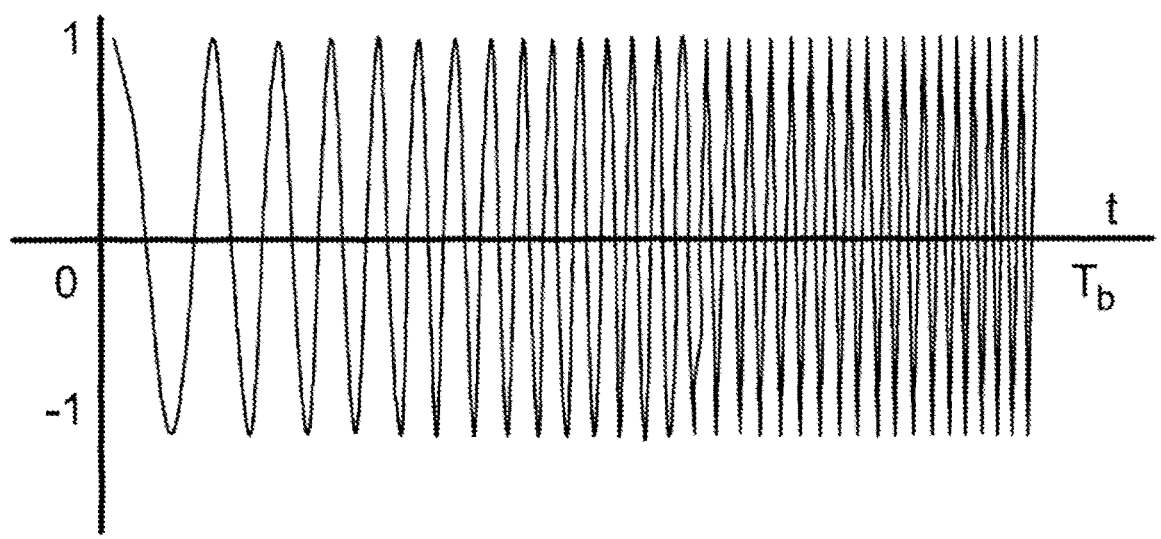
FIGS. 1A-1B illustrate (a) digital chirp signal over $T_b$=20 ms, and (b) instantaneous frequency sweeps from $f_1$=0 rad/sec to $f_2$=1350 rad/sec over $T_b$=20 ms.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system for transmission and coherent detection of data signals modulated by a plurality of overlapping chirps in a chirp spread spectrum communication system (CSS), a method for coherent detection of an encoded stream of data signals modulated by a plurality of overlapping chirps in a chirp spread spectrum communication system (CSS) and a method for transmitting an encoded stream of data signals modulated by a plurality of overlapping chirps in a chirp spread spectrum communication system (CSS).

The chirp spread spectrum (CSS) is a spread spectrum technique that uses wideband linear frequency modulated chirp pulses to encode information. A chirp is a sinusoidal signal of frequency which increases or decreases over time (often with a polynomial expression for the relationship between time and frequency). As with other spread spectrum methods, the chirp spread spectrum uses its entire allocated bandwidth to broadcast a signal, making it robust to channel noise. Further, because the chirps utilize a broad band of the spectrum, the chirp spread spectrum is also resistant to multi-path fading even when operating at very low power. However, it is unlike direct-sequence spread spectrum (DSSS) or frequency-hopping spread spectrum (FHSS) in that it does not add any pseudo-random elements to the signal to help distinguish it from noise on the channel, instead relying on the linear nature of the chirp pulse.

The chirp signal is an analog signal with instantaneous frequency that linearly sweeps from minimum to maximum frequency values over the duration of the bit, $T_b$. The instantaneous frequency is a useful concept for describing non-monochromatic (polychromatic) signals. It is defined as:

$$v(t) = \frac{1}{2\pi} d\varphi/dt,$$

i.e., essentially as the temporal derivative of the oscillation phase φ. The instantaneous frequency is generally a time-dependent frequency. The concept of the instantaneous frequency is particularly important in the context of frequency noise and phase noise.

The overlapping chirp symbol is a technique used to increase the data rate (to data rate $R_{new}$) of chirp spread spectrum (CSS) systems (data rate $R_{old}$). In CSS systems, chirp signals are used to modulate binary symbols i.e., Mark (or logic One) and Space (or logic Zero).

In bandpass modulation (e.g. ASK, FSK and PSK), the mark and space (logic 1 and logic 0) are modulated using sinusoidal carrier with a fixed frequency over the duration of digital bit ($T_b$). However, in a CSS system, the Mark and Space are modulated using a chirp signal as a carrier.

Figure 1B:
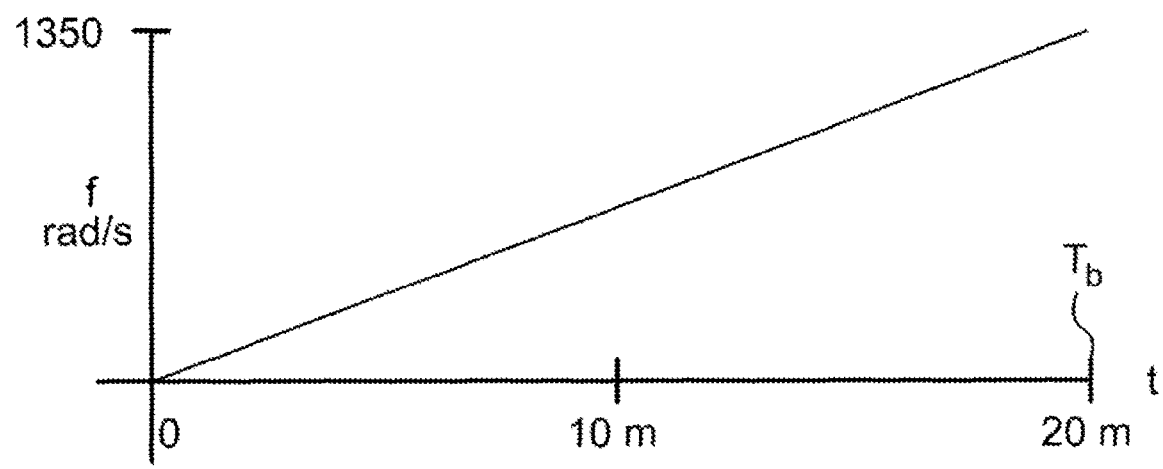

FIG. 1A shows a chirp signal over the range of $T_b$=20 ms and FIG. 1B shows a linear instantaneous frequency which sweeps from $f_1$=0 rad/sec to $f_2$=1350 rad/sec over $T_b$=20 ms.

Inter Symbol Interference (ISI) is a phenomenon that occurs while receiving digital symbols. ISI causes spreading of the energy of the modulated digital symbol, thus consecutive digital symbols interfere with one another. This problem worsens the reception of the digital symbol, especially in case of multipath propagation in the presence of noise disturbances.

CSS performance with respect to ISI is known to be much better than performance of bandpass systems due to the fact that a CSS signal is a wideband signal, i.e., it has bandwidth greater than the keying rate. The keying rate is the rate at which the digital bits are generated. The bandwidth expansion gives CSS signals some immunity against ISI.

CSS performance in terms of signal fading is also superior to that of bandpass systems. Fading is a major impairment for a signal travelling in the space. It is attributed to the signal multipath propagation.

The processing gain (PG) coefficient represents the ratio of the CSS signal bandwidth to the keying rate. The processing gain is calculated as the product of the frequency sweep (F) multiplied by the bit duration ($T_b$), i.e. processing gain: (FT product)=F*$T_b$.

The higher the FT product, the better the performance in terms of multipath fading and ISI. To increase the FT product, either the sweeping frequency range (F) is increased or the bit duration $T_b$ is increased.

Increasing the bit duration $T_b$ results in reducing the keying rate, which reduces the data rate of the generated digital symbols. Increasing the frequency sweep increases the system bandwidth which increases the cost of the system due to the bandwidth requirements.

Selection of the values of F and $T_b$ in CSS should be to satisfy the optimal performance of the spreading (best distribution of the signal power (energy) over the bandwidth). Based on experimentation and theory, the best outcome of the spreading in CSS occurs when the FT product is greater or equal to 54.

Figure 2A:
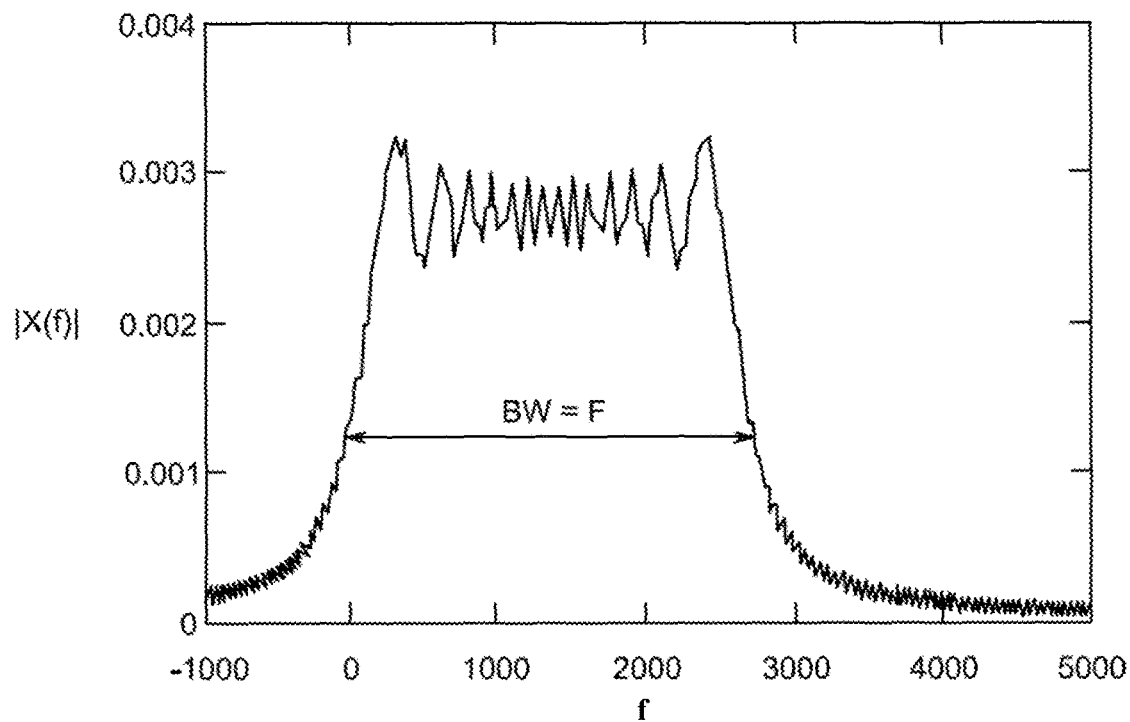
FIG. 2A illustrates a chirp signal with FT=54 where the signal bandwidth is equal to the sweeping frequency range $f_2$-$f_1$=2700 Hz.
Figure 2B:
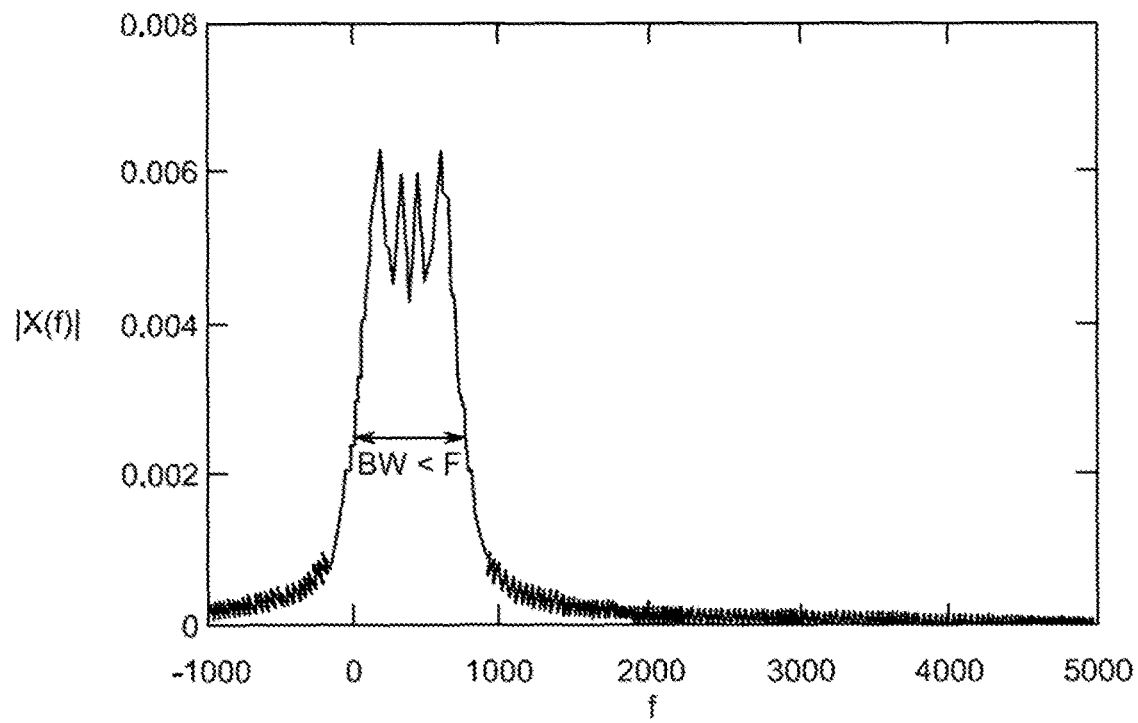
FIG. 2B illustrates a chirp signal with FT=15 the bandwidth is less than the sweeping frequency F which equals to 1500 Hz.

FIG. 2A, 2B shows one chirp signal with FT product equal to 54, in which the bandwidth of the signal is equal to the frequency sweep, (i.e., signal bandwidth equal to the sweeping frequency range $f_2$-$f_1$=2700 Hz, for T=20 ms, FIG. 2A), and another chirp signal with FT product equal to 15, in which the bandwidth of the signal is less than value of frequency sweep, (i.e., the sweeping frequency equals 1500 Hz, for T=20 ms, FIG. 2B). Moreover, the shape of the chirp signal spectrum with higher FT product (FIG. 2A) is more evenly distributed or symmetrical. For an FT product greater than 100, the shape of the spectrum can be approximated as almost perfect rectangular shape. In FIG. 2A, 2B, the horizontal axis represents the frequency and the absolute value of X(f) represents the voltage amplitude.

This present disclosure describes a method of a coherent detection for an overlapped chirp signal given a CSS system with a specific FT product.

Taking advantage of the chirp signal spectral characteristics (rectangular shaped spectrum), the interfering symbol in frequency domain can be characterized to detect the transmitted codes.

Figure 3:
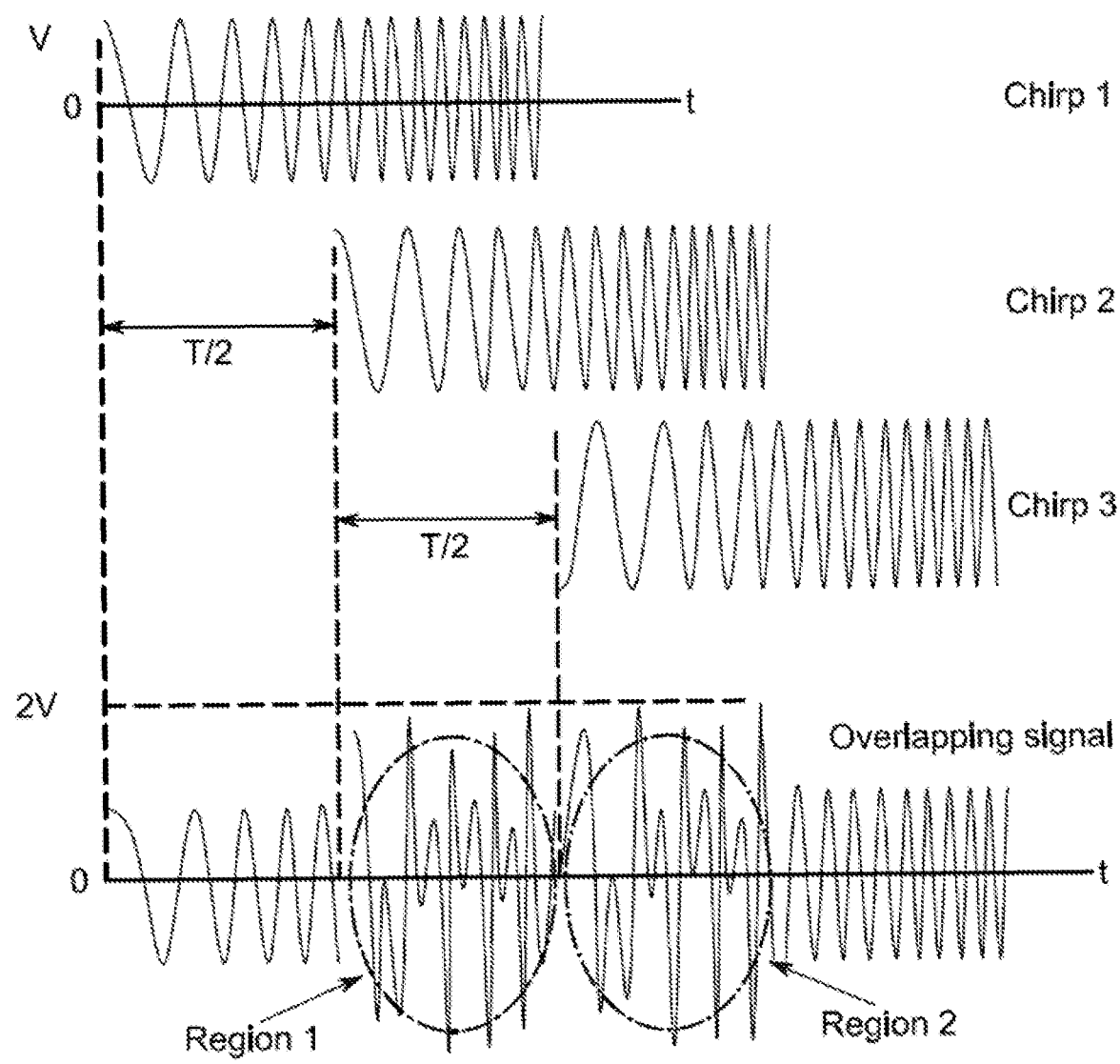
FIG. 3 shows a time-overlapping arrangement for three chirps.

For example, FIG. 3 demonstrates the time overlapping of three chirp symbols (chirp 1, chirp 2 and chirp 3) separated by T/2 in which each symbol represents a bit (0 or 1). Referring to FIG. 3, the frequency sweep in each of the three symbols is from 0 Hz to 4 kHz, while chirp 1 and chirp 2 have a different sign than chirp 3 to indicate that they represent opposite logic (chirp 1 and 2 represent logic 1 and chirp 3 represents logic 0). The resulting overlapping signal shows the three symbols overlapping with one another (in the time domain). In region 1, the high frequency components (from 2 kHz to 4 kHz) of chirp 1 overlap with the low frequency components (from 0 Hz to 2 kHz) of chirp 2, and in region 2, the low frequency components of chirp 3 overlap with the high frequency components of chirp 2. In the present disclosure, frequency analysis is used to detect the received bits from the overlapping regions.

Figure 4:
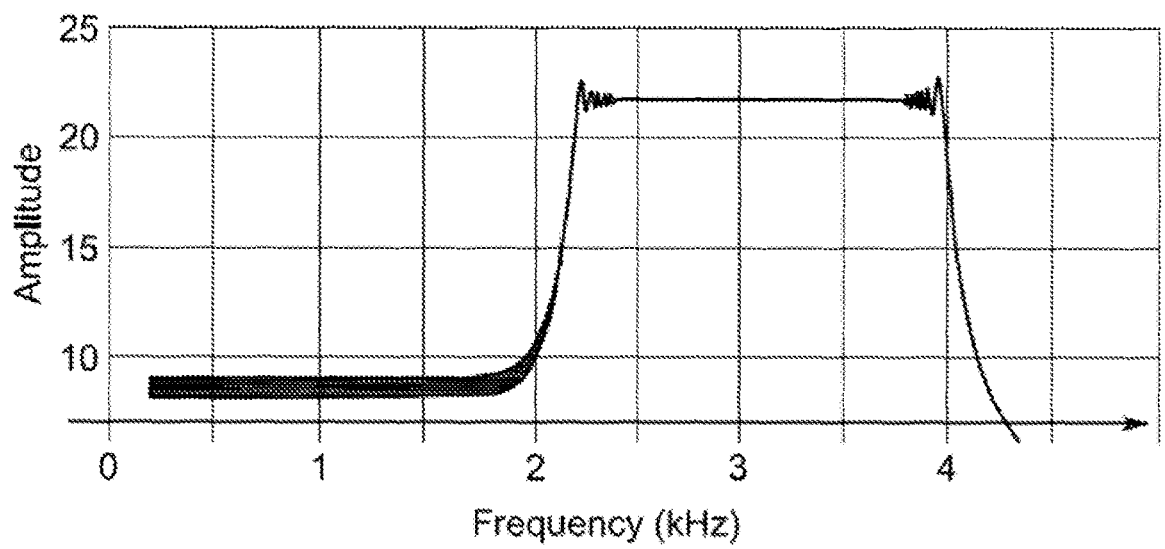
FIG. 4 is a graph illustrating the spectrum of the overlapping signal for the three overlapping chirps of FIG. 3.

FIG. 4 shows the spectrum of the overlapping signal including the overlapping regions (region 1 and region 2) as shown in FIG. 3. From 0 Hz to 2 kHz, the amplitude level of the overlapping region 2 in the frequency domain is at a minimum while the amplitude of the overlapping region 1 is maximum from 2 kHz to 4 kHz. In region 1 where chirp 1 and chirp 2 have the same sign (in phase), the amplitudes of chirp 1 and chirp 2 add, while in the region 2 where chirp 2 and chirp 3 have different signs (out of phase by 180°), the amplitudes of chirp 1 and chirp 2 cancel.

Figure 5:
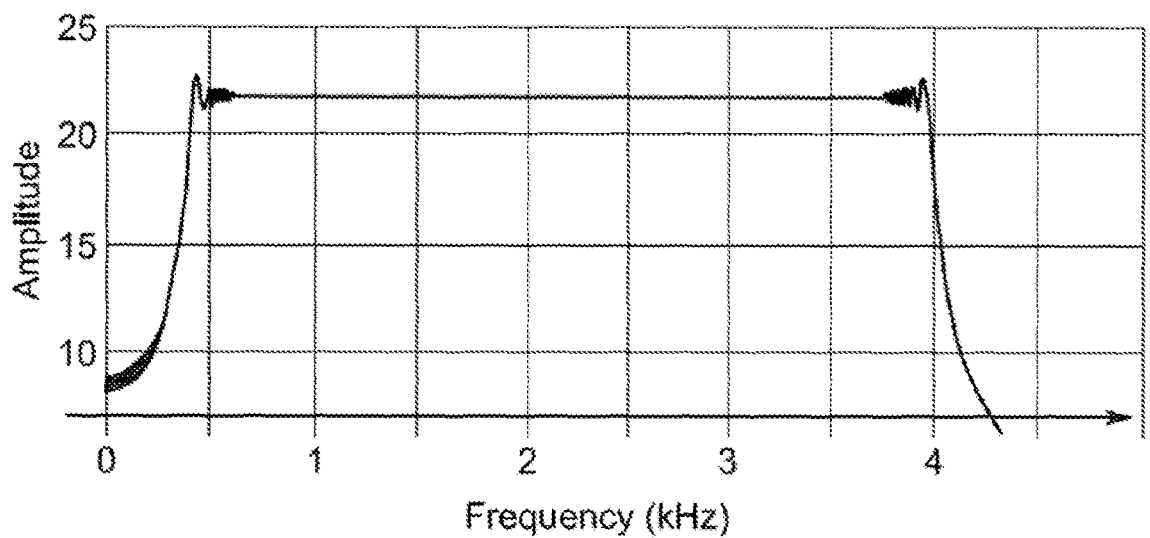
FIG. 5 is a graph illustrating the spectrum of chirp 2 of FIG. 3 without overlapping.

For the sake of comparison, FIG. 5 shows the spectrum of any of the chirp signals without interference by overlapping, where the chirp signal extends from 0 to 4 kHz frequency in comparison as compared with FIG. 4.

Aspects of the present disclosure describe coherent detection of overlapped chirp signals.

Figure 6A:
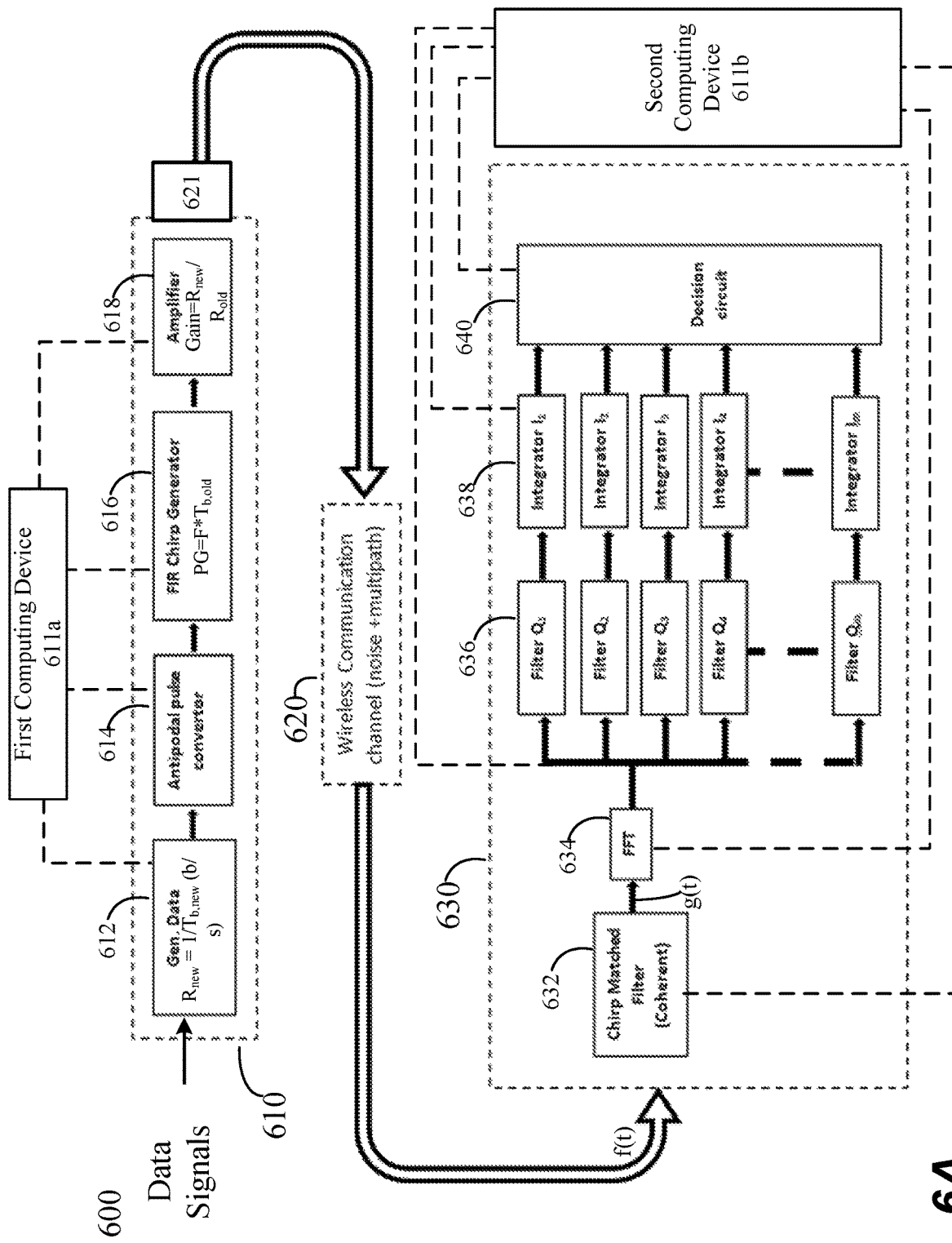
FIG. 6A is a system block diagram having an adaptive overlapping transmitter and a coherent receiver.

FIG. 6A shows the system in a block diagram 600 for transmission and coherent detection of overlapped chirp signals.

The adaptive overlapping transmitter 610 includes a first computing device 611a including a computer-readable medium comprising program instructions, executable by processing circuitry, to cause the processing circuitry to operate the components of the adaptive overlapping transmitter to perform the encoding of the data signals with overlapping chirp signals.

At an adaptive overlapping transmitter 610, the data are generated at a new data rate $R_{new}$ ($R_{new}$=1/$T_{b,new}$), which is higher than the CSS system original data rate $R_{old}$ ($R_{old}$=1/$T_{b,old}$), step 612 (without overlapping).

Figure 7A:
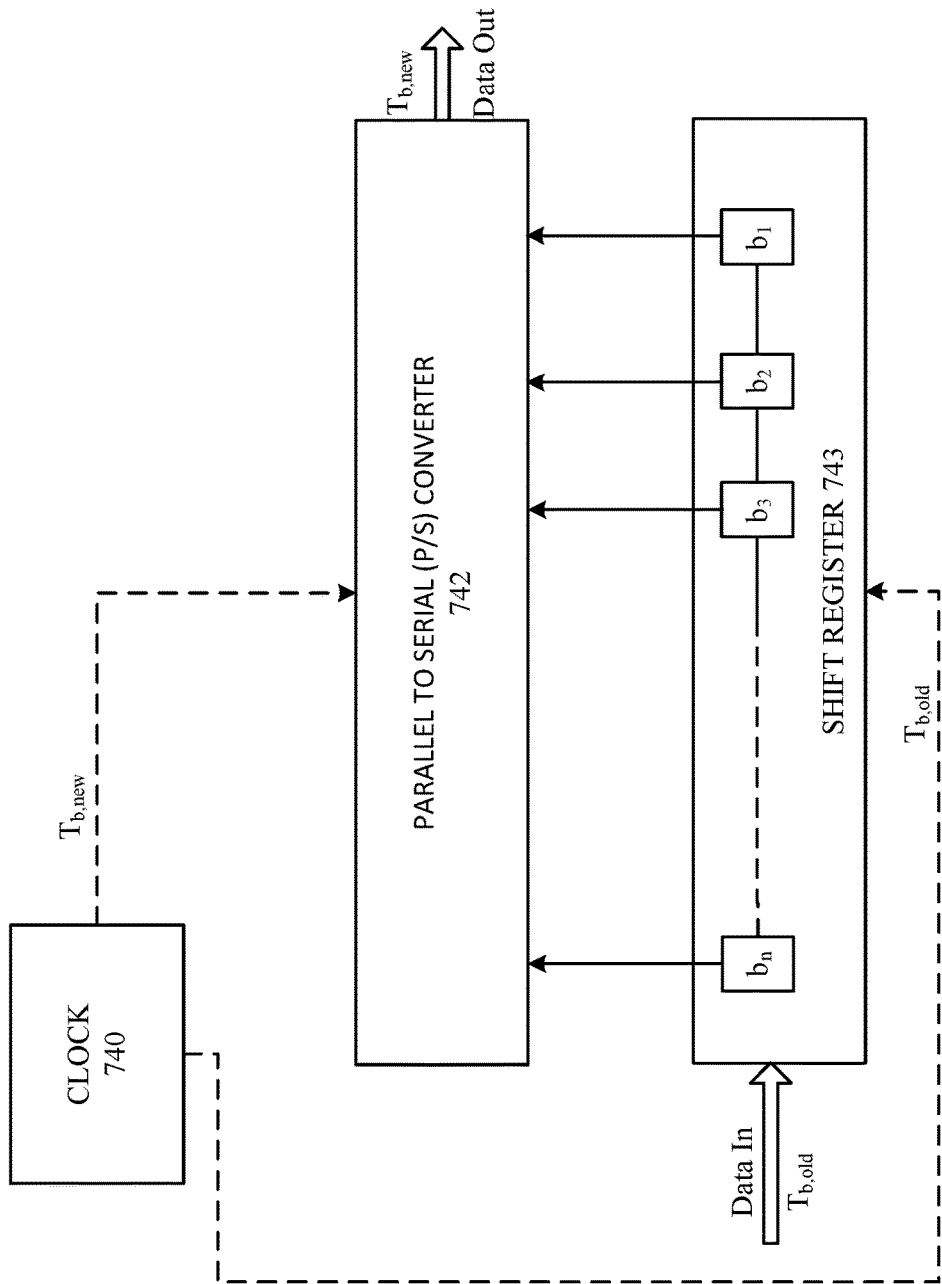
FIG. 7A illustrates the data rate generator of FIG. 6A.

FIG. 7A is a block diagram of the data rate generator 612. The input to the data rate generator is the data stream with its original data rate, $R_{old}$, and the output is the data stream with its new data rate, $R_{new}$. This process is accomplished in the following steps:
 1. Data In at $T_{b,old}$ enters a shift register 743 implemented using memory elements (D-flipflops). The number of memory elements (n) in the shift register is usually a multiple of 2 (e.g. 4, 8, 16 . . . ).
 2. The shift register fills up with the input data stream, where at each clock signal, the input bit is shifted to the next flipflop thus the first bit in the stream that enters the shift register is written in the flipflop position ($b_1$) and the last bit to enter the shift register is written into the ($b_a$) flipflop position.

3. Once the $n^{th}$ bit enters $b_n$ position, the parallel to serial convertor 742 reads the bits stored in the memory elements in parallel and generates the stream again serially at the new $R_{new}$ rate in the same order it entered.

4. A clock circuit 740 provides the clock signal to drive both the shift register 543 and the P/S convertor 742, thus the clock rate for the P/S convertor ($1/T_{b,new}$) is a multiple of the clock rate provided to the shift register ($1/T_{b,old}$).

The clock signal is generated by the first computing device 611a.

Figure 7B:
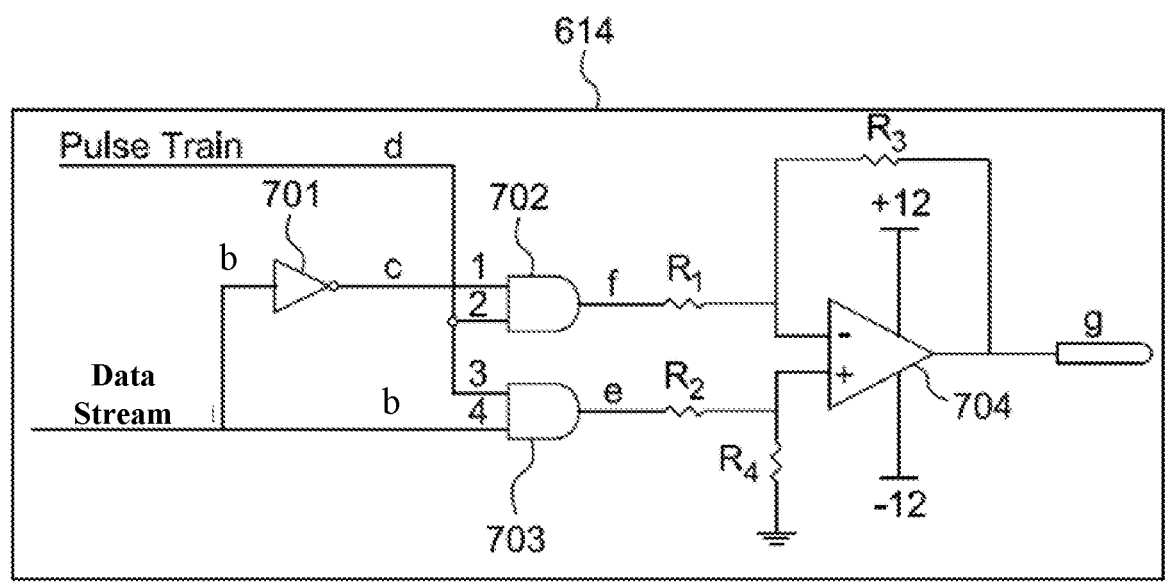
FIG. 7B illustrates the antipodal pulse convertor of FIG. 6A.
Figure 7C:
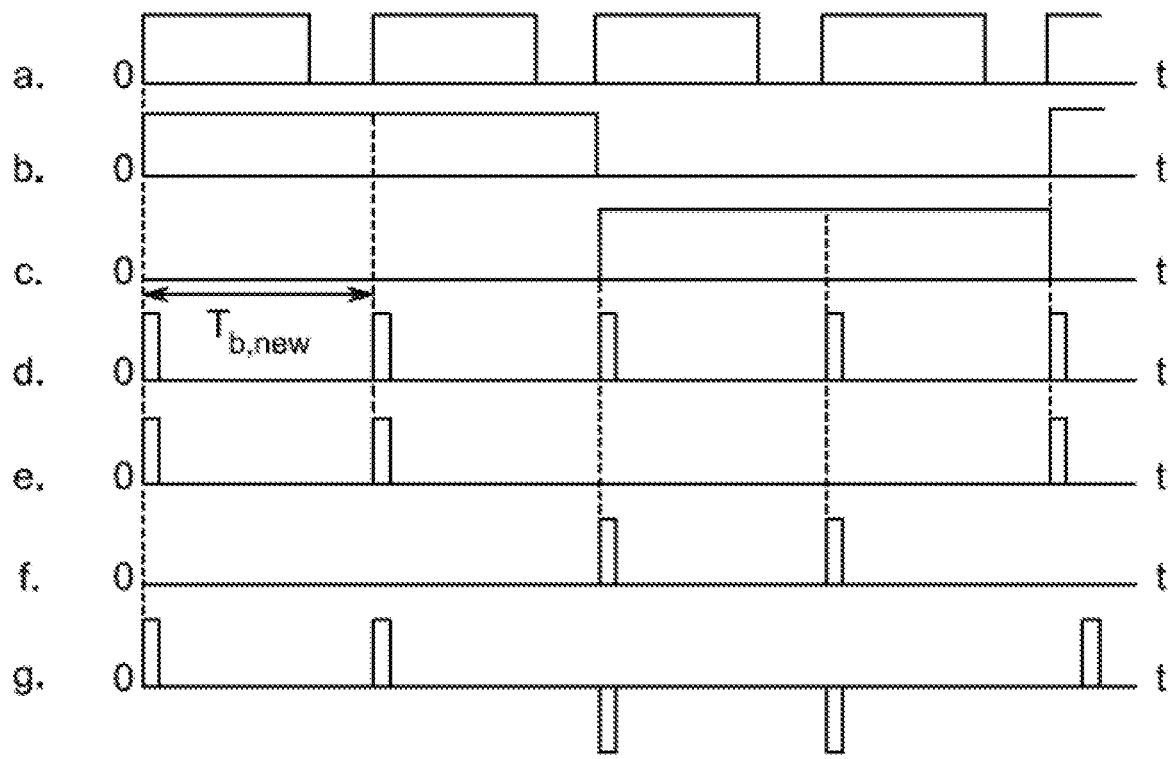
FIG. 7C illustrates the signals at different points for the antipodal pulse converter of FIG. 7A.

The generated data are converted to antipodal pulses at antipodal pulse converter 614, thus the logic one and logic zero are converted into positive and negative pulses and are used to impulse the FIR chirp generator 616 to generate CSS signals. FIG. 7B shows a circuit diagram of the antipodal pulse converter. FIG. 7C shows an example of antipodal pulse conversion, in which it can be noted that the pulse rate of the generated pulses (g) are equivalent to the desired higher data rate $R_{new}=1/T_{b,new}$.

In FIG. 7B, a pulse train (d) at data rate $T_{b,\ new}$ is input to AND gate 702 at input 2 and to a second AND gate 703 at input 3. The transmitted data stream is input at (b) to inverter 701 and the inverter output (c) is input to AND gate 702 at input 1. The transmitted data stream (b) is also input at to AND gate 703 at input 4. The output of AND gate 702 (f) passes through resistor $R_1$ and is input to the inverting input of operational amplifier 704. The output of AND gate 703 (e) passes into a voltage divider formed by resistor $R_2$ and $R_4$ and is input to the non-inverting input of operational amplifier 704. The output of the operational amplifier is fed back through resistor $R_3$ to the inverting input and is also received at (g) which is the output of the antipodal pulse converter 614. In a non-limiting example, the resistors are 10 ohm resistors and the amplifier 704 can be an LM741 operational amplifier (See LM741 Operational Amplifier, Texas Instruments, P. O. Box 655303, Dallas, Tex.). The pulse train is generated by the first computing device 611a and the AND gates (702, 703) and operational amplifier (704) are biased by the first computing device 611a.

FIG. 7C shows the pulse trains at circuit points (a)-(g) of the antipodal pulse converter of FIG. 7B.

In FIG. 7C, the pulse trains represent:
 (a) The clock signal;
 (b) The transmitted data stream;
 (c) The inverse of the transmitted data stream;
 (d) The input train of pulses at data rate $T_{b,\ new}$;
 (e) (b)+(d);
 (f) (c)+(d);
 (g) (e)−(f).

Figure 8A:
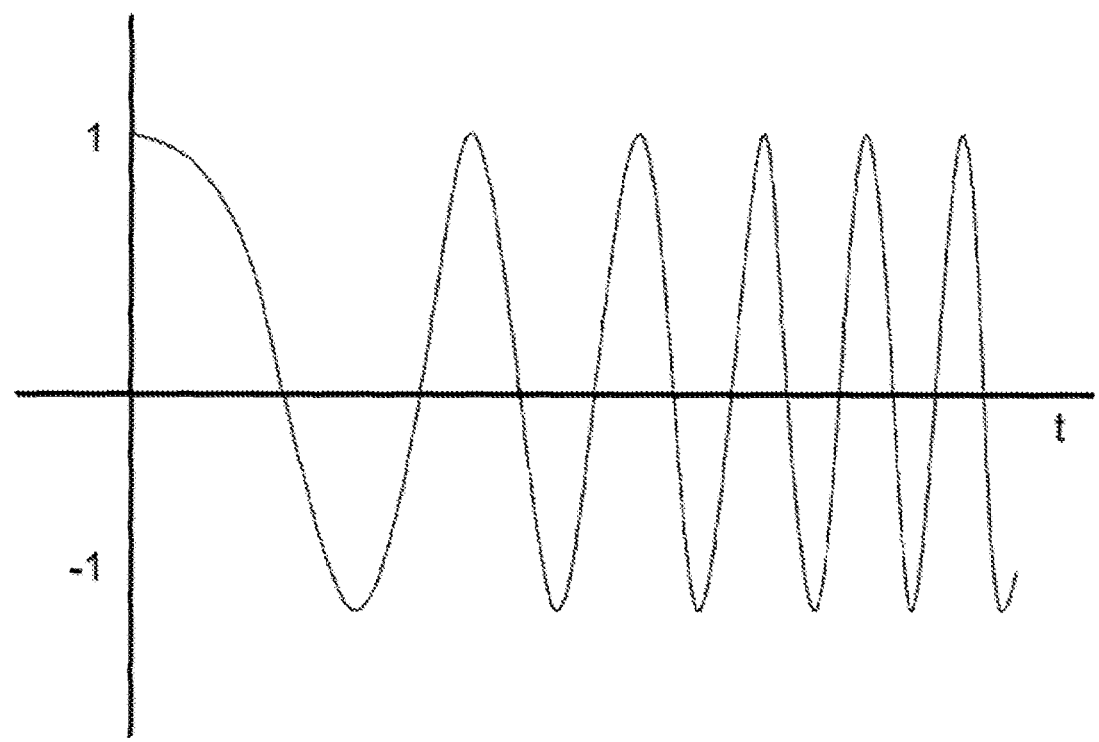
FIGS. 8A-8B illustrate (A) positive chirp +s(t) to represent logic 1 and (B) negative chirp
s(t) to represent logic 0.
Figure 8B:
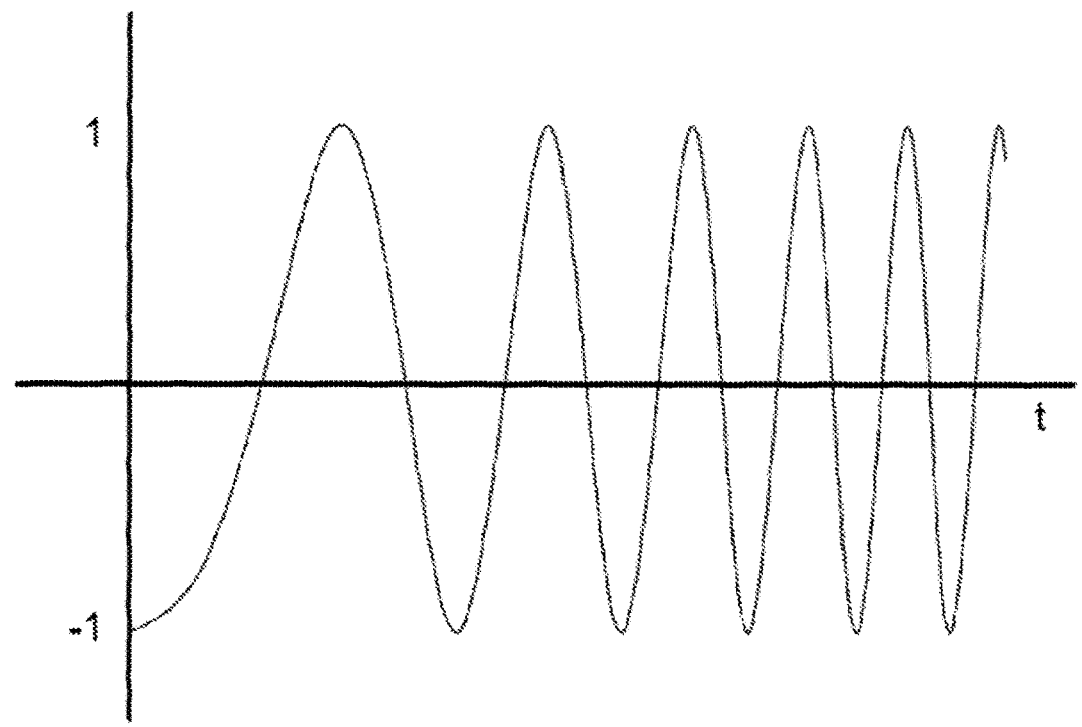

The antipodal pulses (g) are used to impulse the Finite Impulse Response (FIR) filter of the FIR chirp generator 616 which is programmed to generate the chirp signal by modifying the FIR coefficients. The FIR filter is designed using digital signal processing (DSP) thus when a pulse is applied (a digital signal with very short duration) the output of that filter produces a chirp signal +s(t) if the pulse is positive (representing logic 1, Mark) as shown in FIG. 8A, or −s(t) if the pulse is negative (representing logic 0, Space), as shown in FIG. 8B. The output chirp signal has processing gain equal to the original sweeping frequency (F) multiplied by the original bit duration ($T_{b,old}$) to maintain the system FT product. FIG. 9A, 9B show two examples of the output of the FIR Chirp generator 616 being impulsed by antipodal pulses (from antipodal pulse generator 614, FIG. 6). In FIG. 9A, there is no overlapping in the consecutive bits in the CSS transmission transmitted from FIR Chirp generator 616 at the rate of $R_{old}=1/T_{b,old}$ (as shown on the right in FIG. 9A). In FIG. 9B there is time overlapping in the consecutive bits in the CSS transmission transmitted from FIR Chirp generator 616 as the pulse rate has been increased to $R_{new}=1/T_{b,new}$ when $T_{b,new}=T_{b,old}/2$.

Referring back to FIG. 6A, the final stage at the transmitter side is to apply the output of the FIR chirp generator 616 to an amplifier 618 with a gain equal to $R_{new}/R_{old}$. For example, if the goal is to increase the data rate by order of 4, i.e., the $R_{new}=4R_{old}$, the adaptive gain of the signal in this case must be at least 4 in order to have the same performance (in terms of bit error rate in the presence of noise) as there is no time overlapping. The increase in data rate scales linearly with the transmitted power to obtain the same performance as with no overlapping.

The first computing device 611a is configured to input clock signals to the data rate generator and the antipodal pulse filter; provide bias voltages to the AND gates and operational amplifier of the antipodal pulse converter; adjust the set of first filter coefficients of the FIR chirp generator; provide voltage to the amplifier; and provide timing signals to the amplifier.

Transmitter 621 transmits the CSS signals are transmitted over a wireless communication channel 620 having noise plus multipath interference. The transmitted CSS signals are then received by coherent receiver 630 into a coherent chirp matched filter 632 where a time-inverted chirp signal is generated locally, synchronized and convolved with the received stream. The inverted reference signal has the same frequency sweep F and FT product of the original data rate, i.e. FT=F*$T_{b,old}$. Coherent chirp matched filtering is implemented to track the phase and frequency information carried by the transmitted signal.

In theory, to design a matched filter for any signal f(t), the impulse response of its matched filter must be h(t)=f(−t) thus the output of this process is g(t)=f(t)*h(t) where the asterisk "*" represents the convolution operation.

Figure 6B:
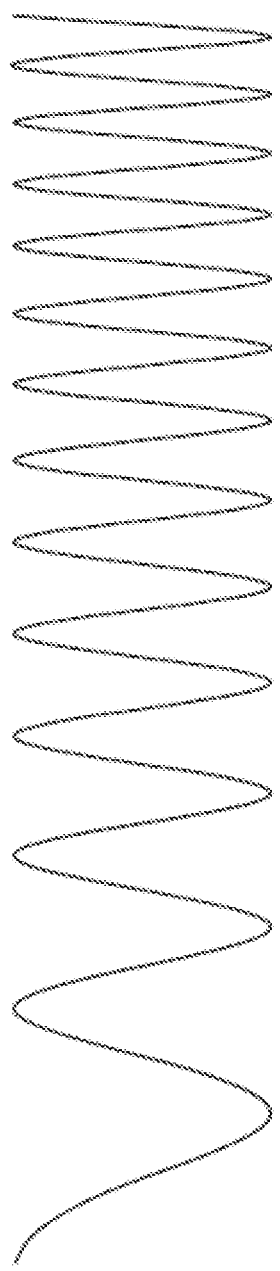
FIG. 6B shows an up chirp signal.
Figure 9C:
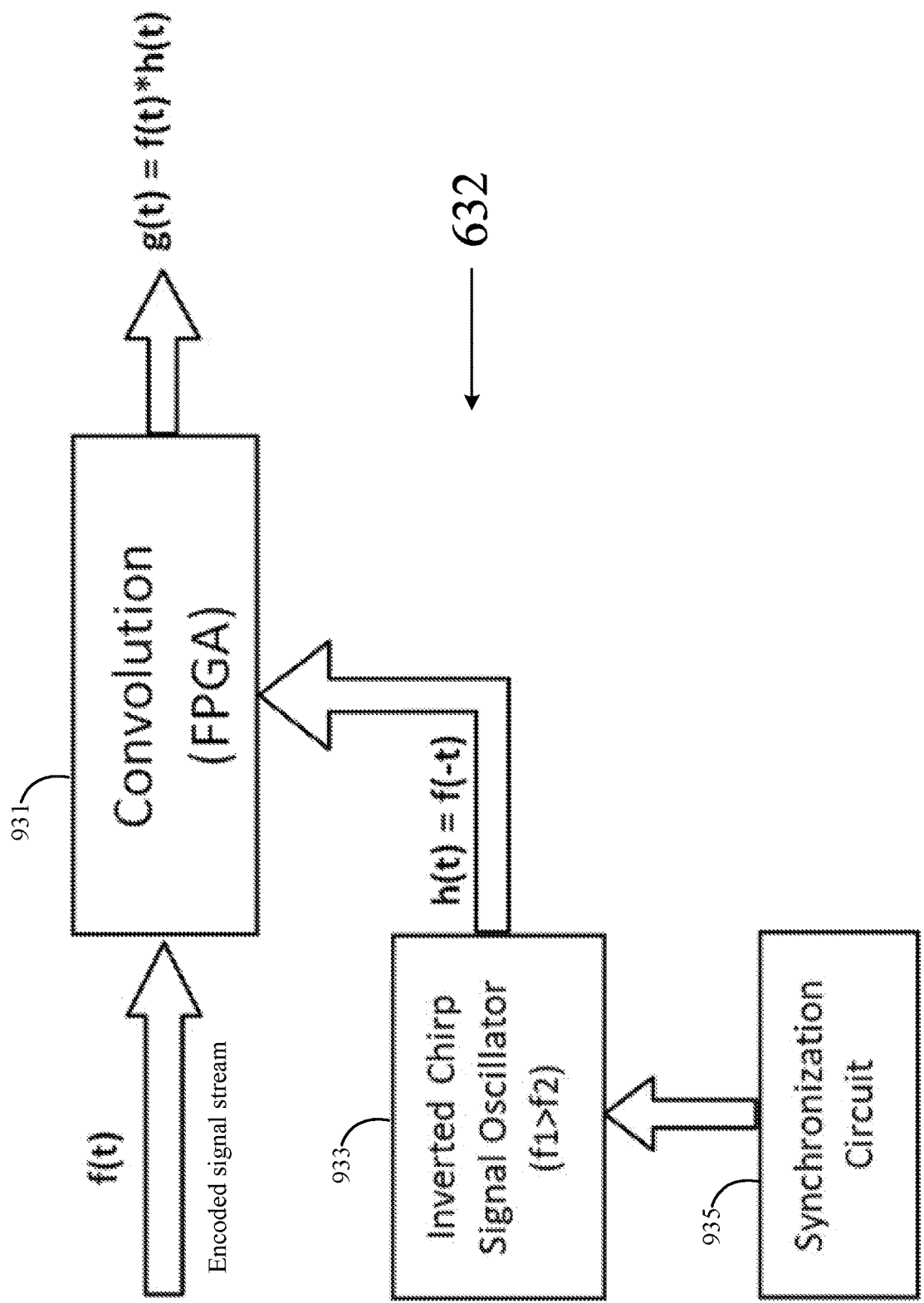
FIG. 9C illustrates the output of the FIR Chirp generator impulsed by antipodal pulses in which there is there is time overlapping as the pulse rate is increased to $R_{new}$=1/$T_{b,new}$ when $T_{b,new}$=$T_{b,old}$/2.

FIG. 9C shows the chirp matched filter 632 in greater detail as a block diagram where the received chirp signal f(t), has an up-chirp sweeping such that the starting frequency, $f_1$, is less than the ending frequency, $f_2$. This up-chirp signal is shown in FIG. 6B.

Figure 6C:
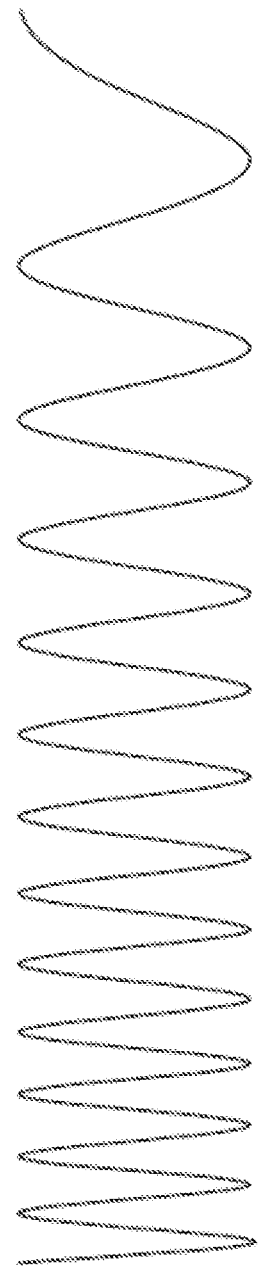
FIG. 6C shows a down chirp signal.

The down-chirp signal, h(t), is locally generated at the receiver using an inverted chirp signal oscillator 933. The signal h(t)=f(−t) has a down-chirp sweeping where the starting frequency, $f_1$, is greater than the ending frequency, $f_2$ as shown in FIG. 6C.

Both f(t) and h(t) are fed as inputs for the convolution circuit 931 which performs the convolution operation of two signals. This convolution circuit can be implemented using field programmable gate array (FPGA) technology.

In order to achieve coherence in detection, time synchronization between the transmitter 610 and the receiver 630 must be ensured, thus a synchronization circuit 935 is used to synchronize the generation of the down-chirp with the received stream.

Figure 6D:
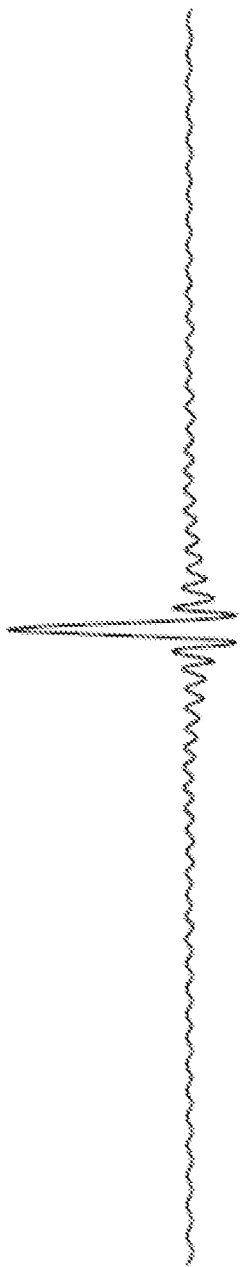
FIG. 6D shows the output of the coherent chirp matched filter.

FIG. 6D shows the expected output, g(t), of the chirp matched filter 632 as a result of the convolution process.

The inverted chirp signal may be generated by impulsing (using short positive pulses) a FIR filter with a chirp signal impulse response in a similar way as in the FIR chirp generator transmitter 916 (see FIG. 9A, 9B). The inverted chirp signal is synchronized with an incoming stream of overlapped chirp signals. This can be achieved by clock synchronization for the transmitter and the receiver using a phase locked loop (PLL) component as a control measure to facilitate synchronization.

A phase locked loop (PLL) generates an output signal whose phase is related to the phase of an input signal. The PLL is an electronic circuit consisting of a variable frequency oscillator and a phase detector in a feedback loop. The oscillator generates a periodic signal, and the phase detector compares the phase of that signal with the phase of the input periodic signal, adjusting the oscillator to keep the phases matched.

After matched filtering, a Fast Fourier transform (FFT) 634 is applied in order to recover the transmitted data is in the frequency domain. An FFT is a computer program which can be implemented on a computer or on a spectrum analyzer. The Fast Fourier transform (FFT) 634 is operatively connected to the second computing device 611*b*, which includes the computer circuitry and a processor needed to run the FFT. In a non-limiting example, an FFT program can be obtained as part of a data analysis package from MATLAB, (see MathWorks Store, https://www.mathworks.com/store/).

Figure 9D:
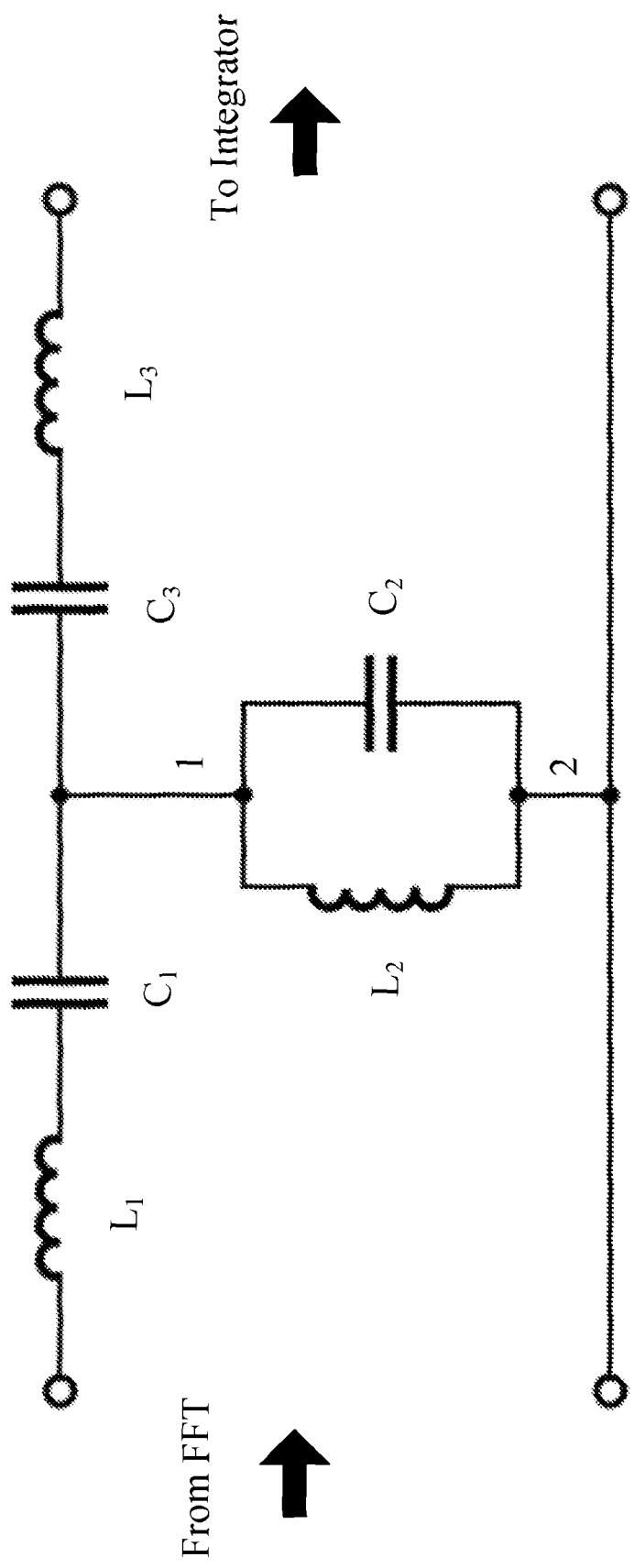
FIG. 9D illustrates a bandpass filter.

The output of the FTT is fed to a bank 636 of bandpass filters. A band-pass filter or bandpass filter (BPF) is a device that passes frequencies within a certain range and rejects (attenuates) frequencies outside that range. Each filter ($Z_1$, $Z_2$, . . . , $Q_m$) filters out the bandwidth portion of the overlapping chirp signal over which an m number of chirp symbols overlap, where m represents the number of bits overlapping during $T_{b,new}$. Each portion of the spectra contains parts of the successive overlapping chirp symbols wherein each represents a bit in a new data stream. As shown in FIG. 9D, a non-limiting example of a bandpass filter includes a series connection of a first inductor L1 and a first capacitor C1 connected to the input (1) of a parallel connection of a second inductor L2 and second capacitor C2. The input signal from the FFT is applied to the first inductor and the output connection (2) of the parallel second inductor and second capacitor. The bandpass filter output is connected to a third capacitor C3 and third inductor L3 in series, which is connected at its input to the input (1) of the parallel connection of a second inductor and second capacitor. The bandpass filter output is also connected to the output (2) of the parallel connection of a second inductor and second capacitor. The frequency range of each bandpass filter may be determined by choosing the capacitor and inductor values, as known in the art.

Figure 9E:
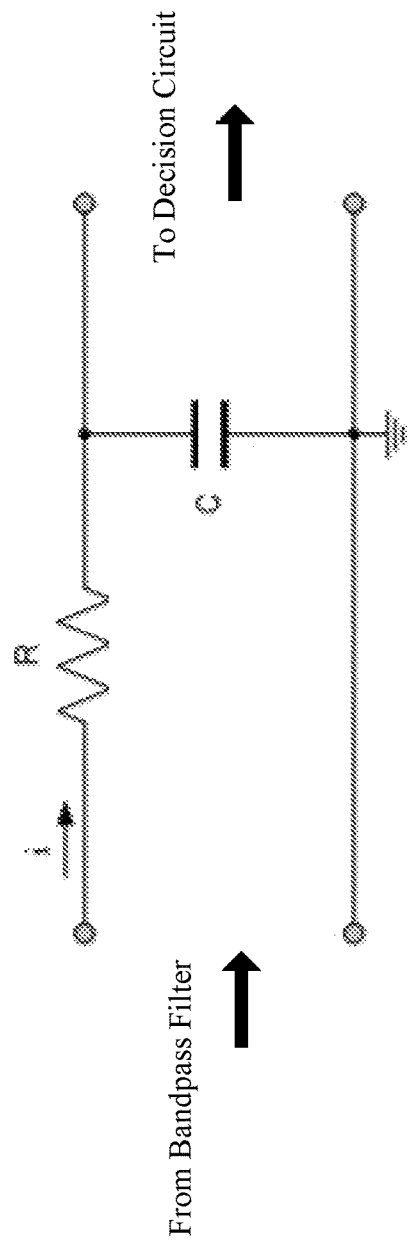
FIG. 9E illustrates an example of a simple integrator circuit.
Figure 9F:
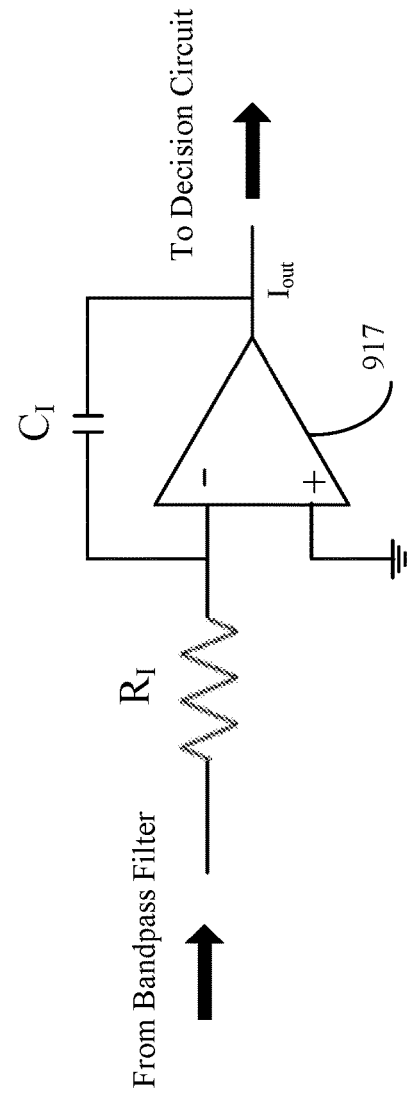
FIG. 9F illustrates an example of an integrator circuit including an operational amplifier.

The output of each filter is then integrated at integrator bank 638 using a corresponding integrator ($I_1$, $I_2$, . . . , $I_m$), and the output of the integrator is fed to a decision circuit 640 to detect the received data from the overlapping chirp signal. In a non-limiting example, an integrator circuit includes at least a resistor and a capacitor, wherein the output of the integrator is taken across the capacitor as shown in FIG. 9E. In another non-limiting example, an integrator circuit may alternatively include a resistor connected to the inverting input of an amplifier with a capacitor in a feedback path between the amplifier output and the inverting input as shown in FIG. 9F.

Figure 10:
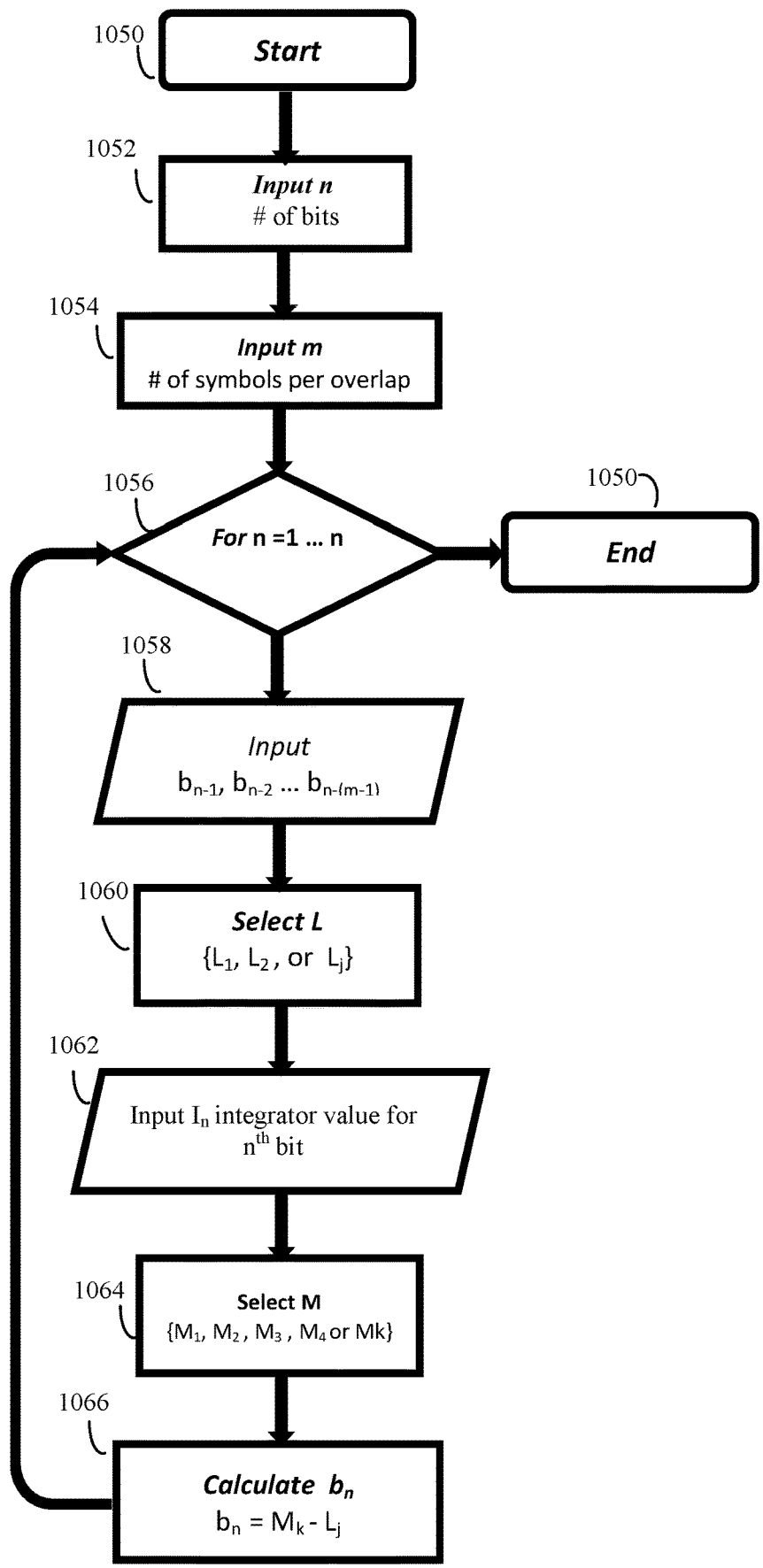
FIG. 10 illustrates the procedure for detection of overlapped chirp modulated data.

The decision circuit detects the received data from the overlapping chirp signal by the procedure shown in FIG. 10. The decision steps are shown in FIG. 10 for an example of a four-fold data rate increase (i.e. $R_{new}/R_{old}=4$).

A second computing device 611*b* is operatively connected to the coherent chirp matched filter, the FFT, the filters 636, the integrators 638 and the decision circuit 640, wherein the computing device is further configured to generate the clock signal 740, execute the FFT, control the time period of the integrator and execute the decision circuit logic.

Figure 11:
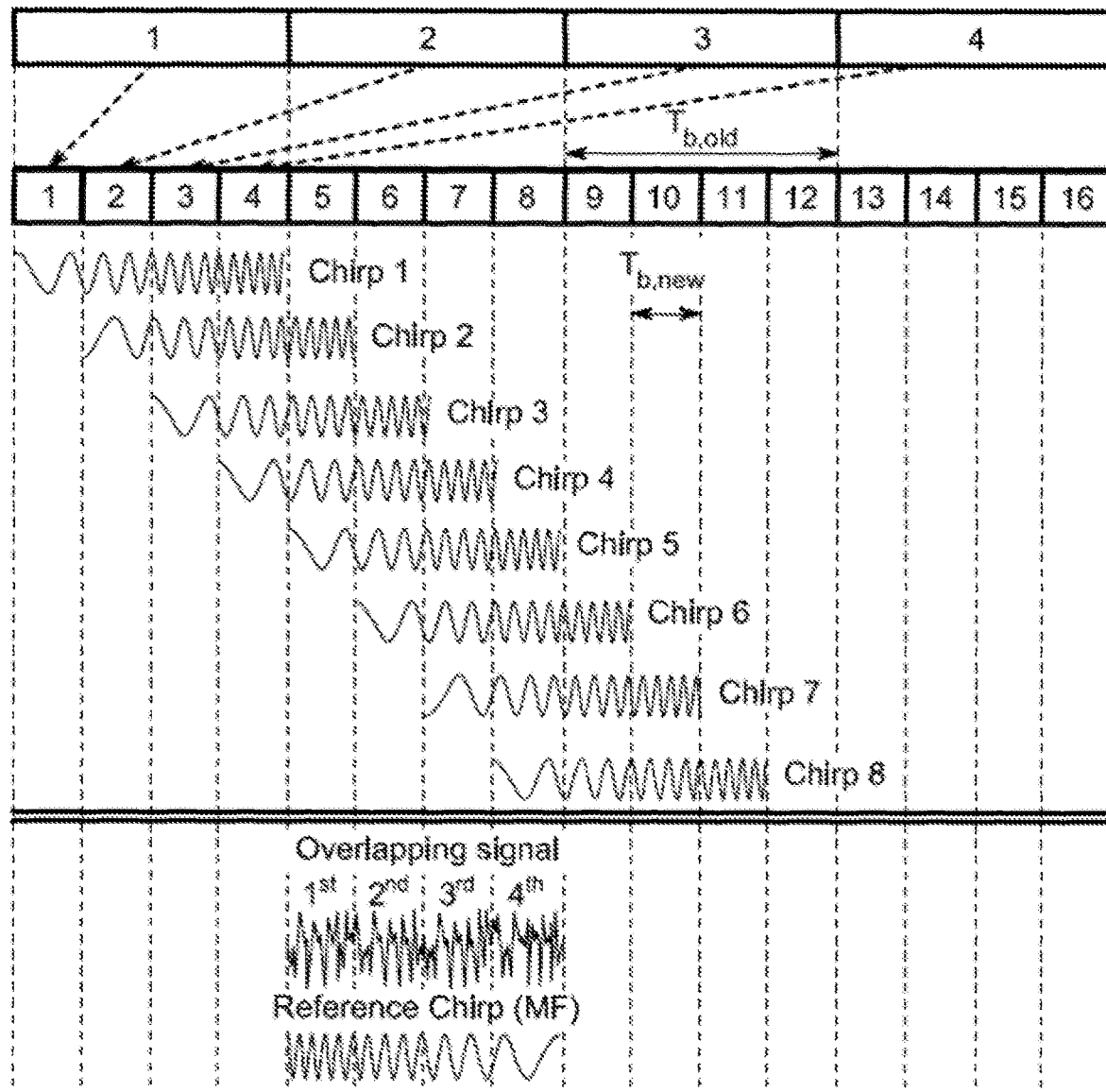
FIG. 11 illustrates the overlapping arrangement for multiple chirps.

The decision circuit 640 is a programmable component of the receiver. It applies the bit detection procedure of FIG. 10, in order to determine the received bits. It also has a storage memory, since it is necessary to have knowledge of a part of the received message in order to detect the rest of the message. Using the input from the integrators 638 and the stored parts of the received message (several bits per iteration), the rest of the message is determined. Increasing the data rate of a CSS system by four fold means that each four consecutive bits are overlapped within the duration of the $T_{b,old}$. FIG. 11 shows the overlapping arrangement for the four fold example which can be generalized for different data rate increases (2, 4, 8, 16, . . . , $R_{max}$), where $R_{max}$ is a finite value determined by the system capabilities.

The example in FIG. 11 shows how each bit in the old data stream with bit duration of $T_{b,old}$ is regenerated in the new data stream with duration $T_{b,new}$ thus the data rate of the new data stream is 4 times higher than the old one.

As for the transmitter described above, each bit in the new stream will be converted to an antipodal pulse which impulses the chirp FIR filter to generate a signed chirp symbol with FT product equal to $F*T_{b,old}$, therefore the chirp symbol should outlast the duration of the corresponding bits in the new data stream. That eventually leads to overlapping among several chirp symbols during each $T_{b,old}$ period.

In FIG. 11, chirp 2 and chirp 7 are generated as negative chirp symbols while the remaining chirp signals have a positive sign (i.e. chirp 2 and 7 are 180° out of phase compared to chirps 1, 3-6 and 8) to indicate that they are representing different logic than the rest chirp symbols (i.e. chirp 2 and chirp 7 represent logic 0 while the rest represent logic 1), as shown in FIG. 8A, 8B.

The maximum number of chirp symbols overlapping in each $T_{b,new}$ duration is equal to the number of m bits in the word. In the four fold example, each word has m=4 bits. Therefore, during the 5$^{th}$ bit in the new data stream, the first quarter, $q_1$, of chirp 5 overlaps with the second quarter, $q_2$, of chirp 4, the third quarter, $q_3$, of chirp 3 and fourth quarter, $q_4$, of chirp 2. Therefore, each quarter of the overlapping chirp signal is made of corresponding quarters of the four consecutive "antipodal" chirp symbols generated in accordance to the new data stream. The overlapping chirp signal is divided into 4 quarters each quarter as the result of overlapping of a $q^{th}$ quarter of the consecutive chirp symbols during $T_{b,new}$. The four quarters of the overlapping chirp signal shown in FIG. 11 is a result of the combination of overlaps shown in Table 1.

TABLE 1

Overlap Combinations for m = 4

| Overlapping chirp signal Quarters (Time) | Overlap Combination |
|---|---|
| 1$^{st}$ quarter | $q_1$ (Chirp 5) + $q_2$ (chirp 4) + $q_3$ (Chirp 3) + $q_4$ (Chirp 2) |
| 2$^{nd}$ quarter | $q_1$ (Chirp 6) + $q_2$ (chirp 5) + $q_3$ (Chirp 4) + $q_4$ (Chirp 3) |
| 3$^{rd}$ quarter | $q_1$ (Chirp 7) + $q_2$ (chirp 6) + $q_3$ (Chirp 5) + $q_4$ (Chirp 4) |
| 4$^{th}$ quarter | $q_1$ (Chirp 8) + $q_2$ (chirp 7) + $q_3$ (Chirp 6) + $q_4$ (Chirp 5) |

Figure 12A:
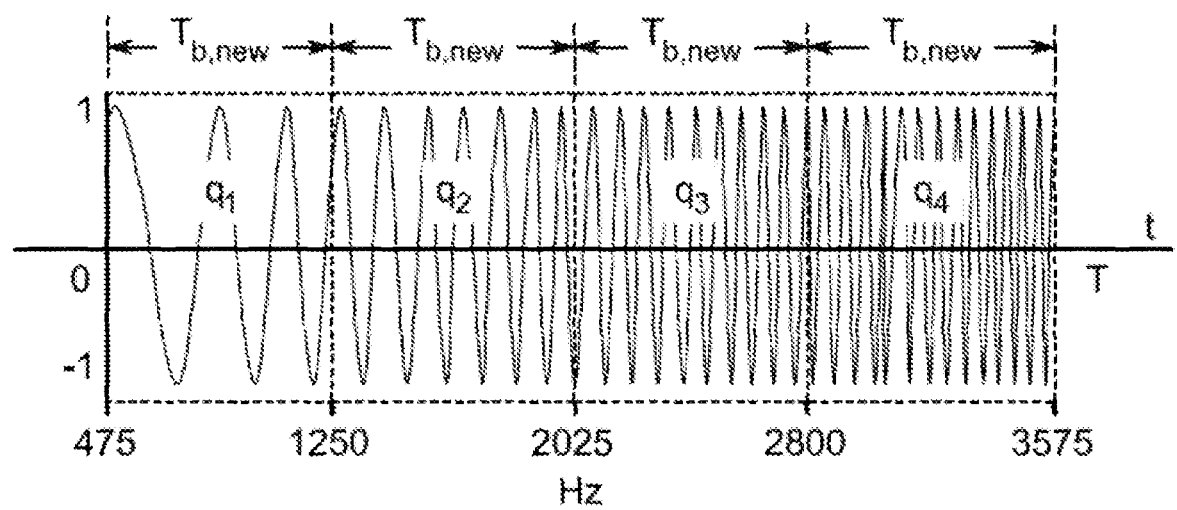
FIG. 12A illustrates that a chirp symbol may be considered as four smaller chirp symbols.
Figure 12B:
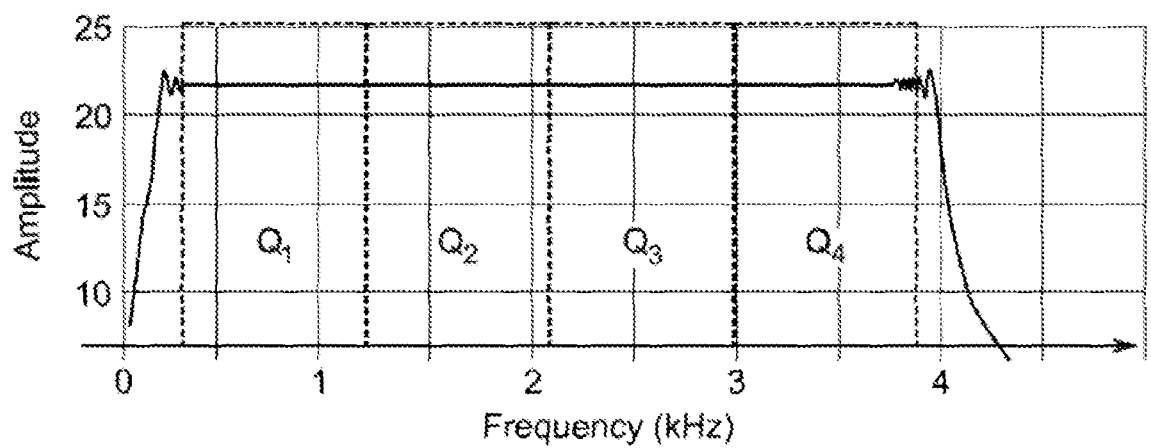
FIG. 12B illustrates the spectrum of the "smaller" chirp symbols ($Q_1$, $Q_2$, $Q_3$, $Q_4$) each occupying a part of the bandwidth according to its portion of the frequency sweep.

Referring again to FIG. 10, the detection procedure is described based on the fact that the overlapping chirp signal is made of a combination of several chirp symbols overlapping at different quarters (for example, $q_1$, $q_2$, $q_3$, $q_4$) at a time. Each chirp symbol can be envisaged as several chirp symbols, as for in the example of FIG. 11 in which four chirp symbols are sequentially generated. Therefore, rather than a chirp symbol with one frequency sweep, there are four chirp symbols which each occupies a portion of the bandwidth. FIG. 12A shows how a chirp symbol may be considered as four smaller chirp symbols. According to this example, the $q_1$ portion sweeps from frequency f=475 Hz to f=1250 Hz, q2 portion sweeps from f=1250 Hz to f=2025 Hz, q3 portion sweeps from 2025 Hz to 2800 Hz and q4 portion sweeps from 2800 Hz to 3575 Hz and the duration of each portion is $T_{b,new}$. FIG. 12B also shows the spectrum of the "smaller" chirp symbols ($Q_1$, $Q_2$, $Q_3$, $Q_4$) each occupying a part of the bandwidth according to its portion of the frequency sweep.

Figures 13, 14:
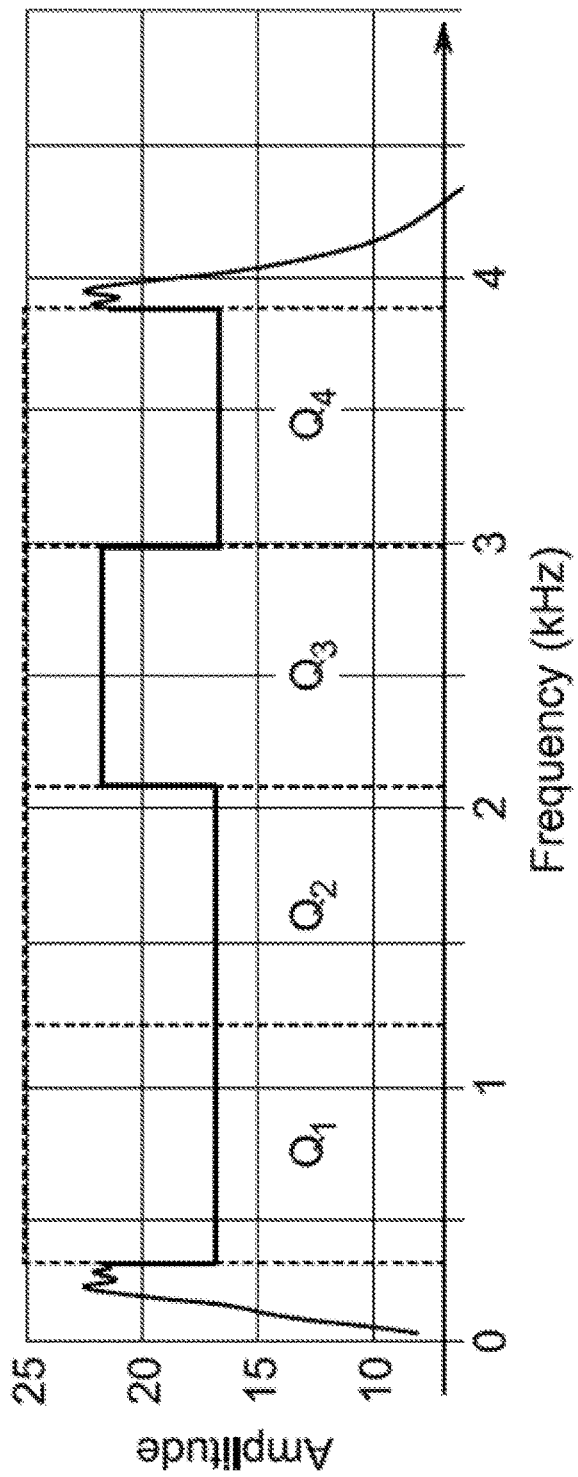
FIG. 13 illustrates the spectrum of the overlapping chirp signal after coherent matched filtering.
FIG. 14 is an example of coding and decoding a 13 bit sequence.

In order to detect a word, for example, bit 5 ($b_5$), bit 6 ($b_6$), bit 7 ($b_7$) and bit 8 ($b_8$), the overlapping signal is applied to the coherent matched filter 632 (see FIG. 6) which is based on the locally generated inverted chirp symbol. The spectrum overlapping chirp signal of the output after coherent matched filtering, shown in FIG. 13, is similar to the spectrum of the chirp symbol (FIG. 12B), with the exception that the amplitudes of the quarters ($Q_1$, $Q_2$, $Q_3$, $Q_4$) are different subject to the phasor summation of the overlapping quarters of the consecutive symbols. In the example, chirp 2 and chirp 7 are of different sign than the rest of chirp symbols, thus the amplitude of each quarter shown in FIG. 13 is given as follows:

$$Q_1 = q_1(\text{Chirp } 5) + q_1(\text{chirp } 6) - q_1(\text{Chirp } 7) + q_1(\text{Chirp } 8) \quad (1)$$

$$Q_2 = q_2(\text{Chirp } 4) + q_2(\text{chirp } 5) + q_2(\text{Chirp } 6) - q_2(\text{Chirp } 7) \quad (2)$$

$$Q_3 = q_3(\text{Chirp } 3) + q_3(\text{chirp } 4) + q_3(\text{Chirp } 5) + q_3(\text{Chirp } 6) \quad (3)$$

$$Q_4 = -q_4(\text{Chirp } 2) + q_4(\text{chirp } 3) + q_4(\text{Chirp } 4) + q_4(\text{Chirp } 5) \quad (4)$$

Therefore, detecting the bits ($b_5$, $b_6$, $b_7$ and $b_8$), is accomplished by solving the equations (1), (2), (3) and (4) given the amplitude values of $Q_i$, $Q_2$, $Q_3$ and $Q_4$ and knowing the three bits detected ahead of each bit as initial conditions in every iteration. This is achieved in iterative fashion starting with solving equation 4 to detect $b_5$, then equation 3 to detect $b_6$, then equation 2 to detect $b_7$ and equation 1 to detect $b_8$. Therefore, in each iteration, in order to detect the bit b, the amplitude value $Q_n$ is subtracted from the summation of the amplitude of the bits ahead of it, i.e. $b_{n-1} + b_{n-2} + b_{n-3}$.

Table 2 shows all possible combinations of each bit, $b_n$, and its predecessors. For the sake of simplicity, "the flat" amplitude of a single chirp signal spectra (before overlapping) is either {−1 or +1}. For example, for four overlapping chirp symbols all of which represent logic 1, then the value of their combination amplitude which corresponds to the common $q^{th}$ components will be 4. The objective is to detect $b_n$ based on (a) the predecessor 3 bits $b_{n-1}$, $b_{n-2}$ and $b_{n-3}$, and (b) the value $Q_n$. The value $Q_n$ represents the amplitude value detected in the circuit of FIG. 6, which can be mapped (assigned) to one of the values of $M_n = \{+4, -4, +2, -2 \text{ or } 0\}$ which represent the summation of any of the four bit combination possibilities. In Table 2, $L_n$ which represents the summation of the amplitudes any three predecessor bits, therefore all possible values $L_n$ are {+3, −3, +1 or −1}.

TABLE 2

Possible Combinations of Bits per Iteration

| # | $b_{n-3}$ | $b_{n-2}$ | $b_{n-1}$ | $b_n$ ($M_n - L_n$) | $L_n$ ($b_{n-1} + b_{n-2} + b_{n-3}$) | $M_n$ ($b_n + b_{n-1} + b_{n-2} + b_{n-3}$) |
|---|---|---|---|---|---|---|
| 1 | +1 | +1 | +1 | +1 | +3 | +4 |
| 2 | +1 | +1 | +1 | −1 | +3 | +2 |
| 3 | +1 | +1 | −1 | +1 | +1 | +2 |
| 4 | +1 | +1 | −1 | −1 | +1 | 0 |
| 5 | +1 | −1 | +1 | +1 | +1 | +2 |
| 6 | +1 | −1 | +1 | −1 | +1 | 0 |
| 7 | +1 | −1 | −1 | +1 | −1 | 0 |
| 8 | +1 | −1 | −1 | −1 | −1 | −2 |
| 9 | −1 | +1 | +1 | +1 | +1 | +2 |
| 10 | −1 | +1 | +1 | −1 | +1 | 0 |
| 11 | −1 | +1 | −1 | +1 | −1 | 0 |
| 12 | −1 | +1 | −1 | −1 | −1 | −2 |
| 13 | −1 | −1 | +1 | +1 | −1 | 0 |
| 14 | −1 | −1 | +1 | −1 | −1 | −2 |
| 15 | −1 | −1 | −1 | +1 | −3 | −2 |
| 16 | −1 | −1 | −1 | −1 | −3 | −4 |

Assigning the integrator values, $I_n$, to one of the $M_n$ values can be achieved by setting five thresholds, each which represents each possible combination (+4, +2, 0, −2, −4). For example, if the four consecutive bits are ones, which gives to an amplitude value $I_n = x$, the value assigned is $M_n = +4$, since the value x can be rounded off (quantized) to the threshold X.

On the other hand, if the four consecutive bits are all zeros and the output of their corresponding $I_n = y$, then the value assigned should be $M_n = -4$ since the value y can be rounded off to a threshold Y.

For the example of FIG. 11, in order to detect the bits $b_5$, $b_6$, $b_7$ and $b_8$ and by knowing bits $b_2$, $b_3$ and $b_4$, the procedure of FIG. 10 can be applied, in four iterations:

Start at step 1050. At step 1052, input the number of bits which will be overlapped (four in this example). At step 1054, input, m, the number of symbols per overlap. At step 1056, for n=1 . . . N, where n≠N, proceed to step 1058 and input $b_2$, $b_3$ and $b_4$ which, according to the example have values −1, +1 and +1 respectively, therefore the $L_n$ value of the three bit combination is $L_5 = -1+1+1 = +1$ which is input at step 1060. At step 1062, input $I_n$ (the integrator value from integrator 638, FIG. 6). At step 1064, the value of M is selected by rounding off the $I_n$ value to match one of the values $M_n$.

At step 1066, calculate $b_n = M_n - L_n$. For the example of FIG. 11, in order to detect $b_5$ for a value of $M_5$ of +2, as shown for combination number 9 of Table 2, $b_5 = +2 - (+1) = +1$, =>$b_5$ represents logic 1.

In the next iteration, $b_6$ is calculated by using $Q_6$, $b_3$, $b_4$ and $b_5$. The following iteration calculates $b_7$ by using $Q_7$, $b_4$, $b_5$ and $b_6$ and the final iteration calculates $b_8$ by using $Q_8$, $b_5$, $b_7$ and $b_7$.

In summary, to decode the overlapping chirp signals, the detection procedure of FIG. 10 is used over several iterations equal to the number of bits in the sequence.

In another non-limiting example, in order to transmit and decode a 13 bit sequence (1001110001111) encoded by overlapping chirp signals, the decoding procedure must be iterated 13 times. In order to decode a bit $b_n$, in the four chirp overlap per $T_{b,new}$ system, the three predecessor bits ahead of $b_n$ must be known. Therefore, to decode the example sequence in the four chirp overlap per $T_{b,new}$ system, the system is first initialized by adding three bits (three 1's) (see 1472, FIG. 14), which are also known by the receiver. The bit sequence is transmitted as <u>111</u>1001110001111. In addition, using Non Return to Zero (NRZ) in the coding of binary data, the binary 0 as (−1) and the binary 1 as (+1) are added, so the sequence is encoded in the transmitter as +1,+1,+1,+1,−1,−1,+1,+1,+1,−1,−1,−1,+1,+1,+1,+1. For convenience, the bits are numbered as shown in FIG. 14.

The bits are decoded using the procedure of FIG. 10. The process at steps 1050, 1052, 1054 starts by inputting the number of bits (13) and the number of chirp signals overlapped per $T_{b,\ new}$, m=4. The process then follows steps 1056-1066 and decodes the sequence from bits $b_1$ to $b_{13}$ sequentially in 13 iterations as shown in Table 3.

Referring to Table 3 and FIG. 10, in order to decode the first bit $b_1$ in the first iteration where n=1, the predecessor three bits are read, which are $b_0$=+1, $b_{-1}$=+1 and $b_{-2}$=+1 and those bits are detected and stored (step 1058). Therefore, at step 1060, $L_1$=(+1)+(+1)+(+1)=+3 is calculated. At step 1062 and 1064, $M_1$ is selected, which depends on the value of the output of integrator $I_1$ that was mapped to one of possible $M_n$ values which are {+4, −4, +2, −2, 0}. Since the first 4 bits were +1,+1,+1,+1, the value of $M_1$ should come out as (+4) after the value of $I_1$ is mapped to one of the values of $M_1$, therefore, in the final step, $b_1$ can be calculated as $b_1$=(+4) (+3)=(+1). $b_1$ is stored and used to decode $b_2$ in the next iteration after the value of $M_2$ is decided based on the $I_2$, and the iterations proceed.

TABLE 3

Decoding Example Sequence

| n | $b_{n-1}$, $b_{n-2}$, $b_{n-3}$ | $L_n$ | $M_n$ | $b_n = M_n - L_n$ |
|---|---|---|---|---|
| 1 | $b_0$, $b_{-1}$, $b_{-2}$<br>+1, +1, +1 | +3 | +4 | +1 |
| 2 | $b_1$, $b_0$, $b_{-1}$<br>+1, +1, +1 | +3 | +2 | −1 |
| 3 | $b_2$, $b_1$, $b_0$<br>−1, +1, +1 | +1 | 0 | −1 |
| 4 | $b_3$, $b_2$, $b_1$<br>−1, −1, +1 | −1 | 0 | +1 |
| 5 | $b_4$, $b_3$, $b_2$<br>+1, −1, −1 | −1 | 0 | +1 |
| 6 | $b_5$, $b_4$, $b_3$<br>+1, +1, −1 | +1 | +2 | +1 |
| 7 | $b_6$, $b_5$, $b_4$<br>+1, +1, +1 | +3 | +2 | −1 |
| 8 | $b_7$, $b_6$, $b_5$<br>+1, +1, +1 | +1 | 0 | −1 |
| 9 | $b_8$, $b_7$, $b_6$<br>−1, −1, +1 | −1 | −2 | −1 |
| 10 | $b_9$, $b_8$, $b_7$<br>−1, −1, −1 | −3 | −2 | +1 |
| 11 | $b_{10}$, $b_9$, $b_8$<br>+1, −1, −1 | −1 | 0 | +1 |
| 12 | $b_{11}$, $b_{10}$, $b_9$<br>+1, +1, −1 | +1 | +2 | +1 |
| 13 | $b_{12}$, $b_{11}$, $b_{10}$<br>+1, +1, +1 | +3 | +4 | +1 |

The first embodiment is illustrated with respect to FIG. 6A-18. The first embodiment describes a system 600 for transmission and coherent detection of data signals modulated by a plurality of overlapping chirps in a chirp spread spectrum communication system (CSS), comprising an adaptive overlapping transmitter 610 configured to receive a stream of data signals at a first data rate, the adaptive overlapping transmitter including a data rate generator 612 configured to increase the first data rate ($R_{old}$) of the data signals to a second data rate ($R_{new}$), an antipodal pulse converter 614 connected in series to the data rate generator and configured to convert the data signals at the second data rate to positive and negative pulses, a finite impulse response (FIR) chirp generator 616 connected in series to the antipodal pulse converter and configured to generate chirp signals from the positive and negative pulses, a gain amplifier 618 connected in series to the FIR chirp generator and configured to increase the gain of the chirp signals and output a chirp modulated stream of data signals, a wireless transmission circuit (not shown) connected in series to the gain amplifier and configured to add three positive pulses to the chirp modulated stream of data signals to generate an encoded stream of data signals and to transmit the encoded stream, a receiver 630 configured to receive the encoded stream, the receiver comprising a coherent chirp matched filter 632 configured to convolve the encoded stream of data signals with an inverted reference chirp signal (h(t)=f(−t)), determine a phase and a frequency of the data signal and generate a chirp matched signal (g(t)), a fast Fourier transform (FFT) circuit 634 connected in series with the coherent chirp matched filter and configured to transform the chirp matched signal to a frequency domain, a plurality of parallel bandpass filters 636 connected to the Fourier transform circuit, each having a discrete frequency range and each configured to output a plurality of filtered signals in the respective discrete frequency range, a bank of parallel integrators 638, wherein each integrator ($I_1, I_2, \ldots, I_m$) is operatively connected to one of the plurality of bandpass filters and configured to sum the amplitudes of the plurality of filtered signals in the discrete frequency range, a decision circuit 640 operatively connected to the bank of integrators and configured to match the sum of the amplitudes of the plurality of filtered signals in the discrete frequency range to a reference value to decode the encoded stream.

Referring to FIG. 7B, the antipodal pulse generator 614 of the system comprises an inverter 701 configured to invert the stream of data signals ($b_1$) at the second data rate and generate an inverted stream of data signals at the second data rate (c); a first AND gate 702 having a first (1) and second input (2) and a first AND output (f), wherein the first input (1) is configured to receive the inverted data stream (c) and the second input (2) is configured to receive a pulse train (d), a second AND gate 703 in parallel with the first AND gate and having a third input (3) and fourth input (4) and a second AND output (e), wherein the third input (3) is configured to receive the pulse train and the fourth input (4) is configured to receive the data stream ($b_2$), a first resistor $R_1$ connected in series with the first AND output, a second resistor $R_2$ connected in series with the second AND output, a first operational amplifier 704 having an inverting and a non-inverting input and a gain output (g), wherein the inverting input is connected in series with the first resistor and the non-inverting input is connected to the second resistor, a third resistor $R_3$ connected in series with the gain output (g) and the inverting input, and a fourth resistor $R_4$ connected to the second resistor and the non-inverting input.

Referring back to FIG. 6A, the FIR chirp generator 616 of the system is further operatively configured to modulate the positive and negative pulses by increasing a modulation frequency over a duration of each pulse so that the product of the frequency and the duration equals a processing gain of 54.

The gain amplifier 618 of the system is operatively configured to increase the gain of the chirp signals by a factor equal to the second data rate divided by the first data rate ($R_{new}/R_{old}$).

The receiver 630 of the system 600 includes coherent chirp matched filter 632 including a convolution circuit 631 configured to receive the encoded stream (f(t)) from the transmitter 610. The convolution circuit 631 receives an inverted chirp signal (h(t)=f(−t)) generated by an inverted chirp signal oscillator 633 which is synchronized (635) with the encoded stream (f(t)), and convolves the encoded stream with the inverted chirp signal and generates the chirp matched signal (g(t)).

Referring now to FIG. 6A and FIG. 9E, the bank of parallel integrators 638 system comprises, for each integrator $I_m$: a second operational amplifier 917 having an inverting input, a non-inverting input and an integrator output $I_{out}$, resistor $R_1$ connected between the output of a bandpass filter and the inverting input, a capacitor $C_i$ connected in a feedback path between the integrator output and the inverting input, and a ground connection connected to the non-inverting input.

Figure 15:
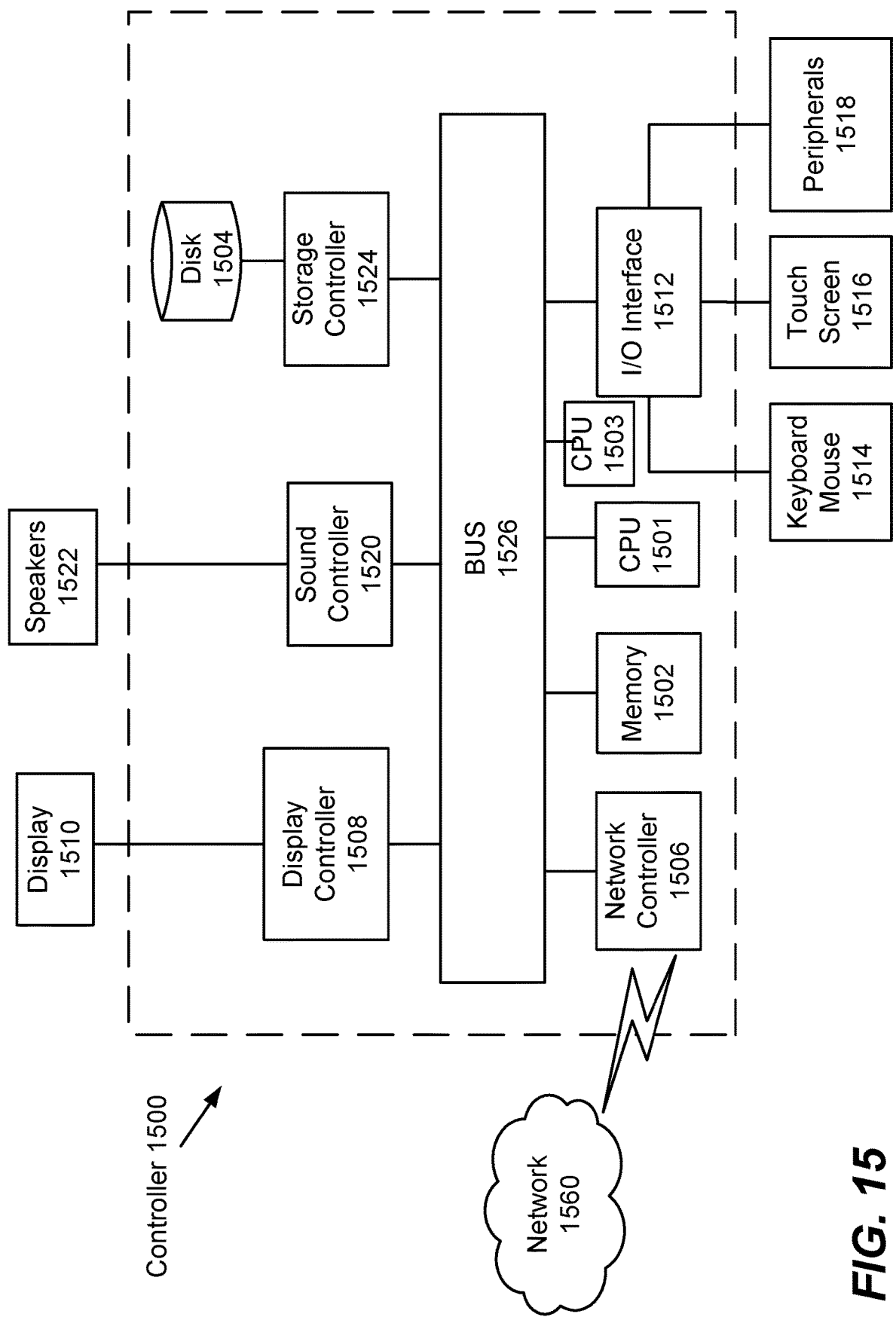
FIG. 15 is an illustration of a non-limiting example of details of computing hardware used in the computing system, according to certain embodiments.

Referring to FIG. 6A and FIG. 15, the decision circuitry 640 of the system further comprises an input/output port 639, a memory 1502, processing circuitry 1501 and program instructions configured to receive a first number, N, of the bits in the encoded stream of data signals from the input/output port, receive a second number, M, of the chirp signals overlapping the data signals from the input/output port, determine a plurality of threshold values based on summing each possible combination of bits in the overlapping chirp signals, decode a first bit, $b_1$, by detecting and storing in the memory a first set of predecessor bits, $b_{n-1}$, $b_{n-2}$, $b_{n-3}$, equal to the second number, m, of chirp signals overlapped, wherein each predecessor bit has an amplitude equal to either +1 or −1, summing the amplitudes of the first set of predecessor bits, matching the output of a first integrator to a threshold value, subtracting the sum of the amplitudes of a first set of predecessor bits from the threshold value to generate a first difference value, storing the first difference value as a first bit of the data signal in the memory 1502, decode a second bit, $b_2$, by incrementing n by 1, summing the amplitudes of a second set of predecessor bits, $b_1$, $b_{n-1}$ and $b_{n-2}$, matching the output of a second integrator to a threshold value, subtracting the sum of the amplitudes of the second set of predecessor bits from the threshold value to generate a second difference value, and storing the second difference value as a second bit of the data signal in the memory, decode each remaining bit, $b_n$, by iteratively incrementing n by 1, summing the amplitudes of the $n^{th}$ set of predecessor bits, matching the output of an $n^{th}$ integrator to a threshold value, subtracting the sum of the amplitudes of the $n^{th}$ set of predecessor bits from the threshold value to generate an $n^{th}$ difference value, storing the $n^{th}$ difference value as a $n^{th}$ bit of the data signal in the memory, continuing to decode each remaining bit until n=N, and providing the N bits as the decoded data signal at the input/output port 639 of the decision circuit.

The second embodiment is illustrated with respect to FIG. 6A-18. The second embodiment describes a method for coherent detection of an encoded stream of data signals modulated by a plurality of overlapping chirps in a chirp spread spectrum communication system (CSS), comprising receiving, by a coherent chirp matched filter 632 (see FIG. 6), the encoded stream of data signals, wherein the data signal comprises a first number of bits having values of either +1 or −1, generating an inverted chirp signal (at 633), convolving (at 631) the encoded stream of data signals with the inverted chirp signal to determine phase and frequency of the data signal and generating a chirp matched signal, fast Fourier transforming (by FFT 634) the chirp matched signal to generate a fast Fourier transformed signal, filtering, by a plurality of bandpass filters 636, the fast Fourier transformed signal, wherein each filter has a discrete frequency range, to generate a plurality of filtered signals in the respective discrete frequency range, integrating each of the plurality of filtered signals by a one of a plurality of integrators 638 to output a sum of the amplitudes of the plurality of filtered signals in the discrete frequency range, decoding, by a decision circuit 640, each of the plurality of integrated signals to detect a bit sequence of the encoded stream of data signals.

The method includes synchronizing (at 635) the inverted chirp signal with the encoded stream of data signals.

Referring to FIG. 10, the method further includes decoding the integrated signals by inputting the first number, N, of the bits in the data signal to the decision circuit (step 1052), inputting a second number, M, of the chirp signals overlapped to the decision circuit (step 1054), determining a plurality of threshold values based on summing each possible combination of bits in the overlapping chirp signals (see Table 3), decoding a first bit, $b_1$, by detecting and storing a first set of predecessor bits, $b_{n-1}$, $b_{n-2}$, $b_{n-3}$, equal to the second number, M, of chirp signals overlapped, wherein each predecessor bit has an amplitude equal to either +1 or −1, summing the amplitudes of the first set of predecessor bits ($L_1$, $L_2$, $L_3$) (step 1060), matching the output of a first integrator ($I_n$) to a threshold value (steps 1062 and 1064), subtracting the sum of the amplitudes of a first set of predecessor bits from the threshold value to generate a first difference value (step 1066), and storing the first difference value as a first bit of the data signal.

The method includes decoding a second bit, $b_2$, by incrementing n by 1 (see iteration loop from 1066-1056), summing the amplitudes of a second set of predecessor bits, $b_1$, $b_{n-1}$ and $b_{n-2}$, matching the output of a second integrator to a threshold value, subtracting the sum of the amplitudes of the second set of predecessor bits from the threshold value to generate a second difference value, and storing the second difference value as a first bit of the stream of data signals.

The method includes decoding the remaining bits by iteratively incrementing n by 1 while n<1V, for each bit, $b_n$, summing the amplitudes of the $n^{th}$ set of predecessor bits, matching the output of an $n^{th}$ integrator to a threshold value, subtracting the sum of the amplitudes of the $n^{th}$ set of predecessor bits from the threshold value to generate an $n^{th}$ difference value, and storing the $n^{th}$ difference value as a $n^{th}$ bit of the data signal and, when n=N, outputting the N bits as a decoded stream of data signals.

The method may include a fourfold system, wherein the second number, m, of the chirp signals overlapped is four and the number of predecessor bits is three.

The method may include where each of the bits of the first set of predecessor bits has a value of +1 and the sum of the amplitudes of the first set of predecessor bits equals +3.

The third embodiment is illustrated with respect to FIG. 6A-FIG. 18. The third embodiment describes a method for transmitting (see adaptive overlapping transmitter 612, FIG. 6A) an encoded stream of data signals modulated by a plurality of overlapping chirps in a chirp spread spectrum communication system (CSS), comprising receiving a stream of data signals at a first data rate ($R_{old}$), increasing the first data rate of the data signals to a second data rate ($R_{new}$) (at data rate generator 612), converting the data signals to positive and negative pulses (by antipodal pulse converter 614), generating chirp signals from the positive and negative pulses (by finite impulse response (FIR) chirp generator, 616), increasing the gain (at amplifier 618) of the chirp signals by a factor equal to the ratio of the second data rate divided by the first data rate ($R_{new}/R_{old}$), outputting a chirp modulated stream of data signals, adding three positive pulses to the chirp modulated stream of data signals to generate an encoded stream of data signals, and transmitting the encoded stream in the chirp spread spectrum communications system.

Referring to FIG. 7B, the method includes converting the data signals to positive and negative pulses by receiving the stream of data signals at the second data rate (shown at b, FIG. 7A), inverting (at inverter 701) the stream of data signals at the second data rate to generate an inverted stream of data signals (c), receiving the inverted stream of data signals at a first input (1) of a first AND gate 702, receiving a pulse train (d) at a second input (2) of the first AND gate and at a third input (3) of a second AND gate 703, receiving the stream of data signals (b) at a fourth input (4) of the second AND gate 703, outputting a first AND logic comparison signal (f) from the first AND gate, outputting a second AND logic comparison signal (e) from the second AND gate, receiving the first AND logic comparison signal at an inverting input of an operational amplifier 704, receiving the second AND logic comparison signal at a non-inverting input of the operational amplifier, feeding back a gain output (through $R_3$) of the operational amplifier to the inverting input; and outputting the positive and negative pulses at the gain output (g).

The method includes wherein generating chirp signals from the positive and negative pulses comprises increasing a modulation frequency over a duration of each pulse so that the product of the frequency and the duration equals a processing gain of 54.

The method further includes adding the three positive pulses by concatenating the three positive pulses with the chirp modulated stream of data signals by a wireless transmission circuit.

Next, further details of the hardware description of the computing environment of FIG. 6A according to exemplary embodiments is described with reference to FIG. 15. In FIG. 15, a controller 1500 is described is representative of the system 600 of FIG. 6A in which the controller is a computing device which includes a CPU 1501 which performs the processes described above/below. The process data and instructions may be stored in memory 1502. These processes and instructions may also be stored on a storage medium disk 1504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1501, 1503 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1501 or CPU 1503 may be a Xenon or Core processor from Intel of America or an Opteron processor from AMD of America, or may be other processor types that would be recognized by one of ordinary skill in the art. Alternatively, the CPU 1501, 1503 may be implemented on an FPGA, ASIC, PLD or using discrete logic circuits, as one of ordinary skill in the art would recognize. Further, CPU 1501, 1503 may be implemented as multiple processors cooperatively working in parallel to perform the instructions of the inventive processes described above.

The computing device in FIG. 15 also includes a network controller 1506, such as an Intel Ethernet PRO network interface card from Intel Corporation of America, for interfacing with network 1560. As can be appreciated, the network 1560 can be a public network, such as the Internet, or a private network such as an LAN or WAN network, or any combination thereof and can also include PSTN or ISDN sub-networks. The network 1560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1508, such as a NVIDIA GeForce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a touch screen panel 1516 on or separate from display 1510. General purpose I/O interface also connects to a variety of peripherals 1518 including printers and scanners, such as an OfficeJet or DeskJet from Hewlett Packard.

A sound controller 1520 is also provided in the computing device such as Sound Blaster X-Fi Titanium from Creative, to interface with speakers/microphone 1522 thereby providing sounds and/or music.

The general purpose storage controller 1524 connects the storage medium disk 1504 with communication bus 1526, which may be an ISA, EISA, VESA, PCI, or similar, for interconnecting all of the components of the computing device. A description of the general features and functionality of the display 1510, keyboard and/or mouse 1514, as well as the display controller 1508, storage controller 1524, network controller 1506, sound controller 1520, and general purpose I/O interface 1512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 16.

Figure 16:
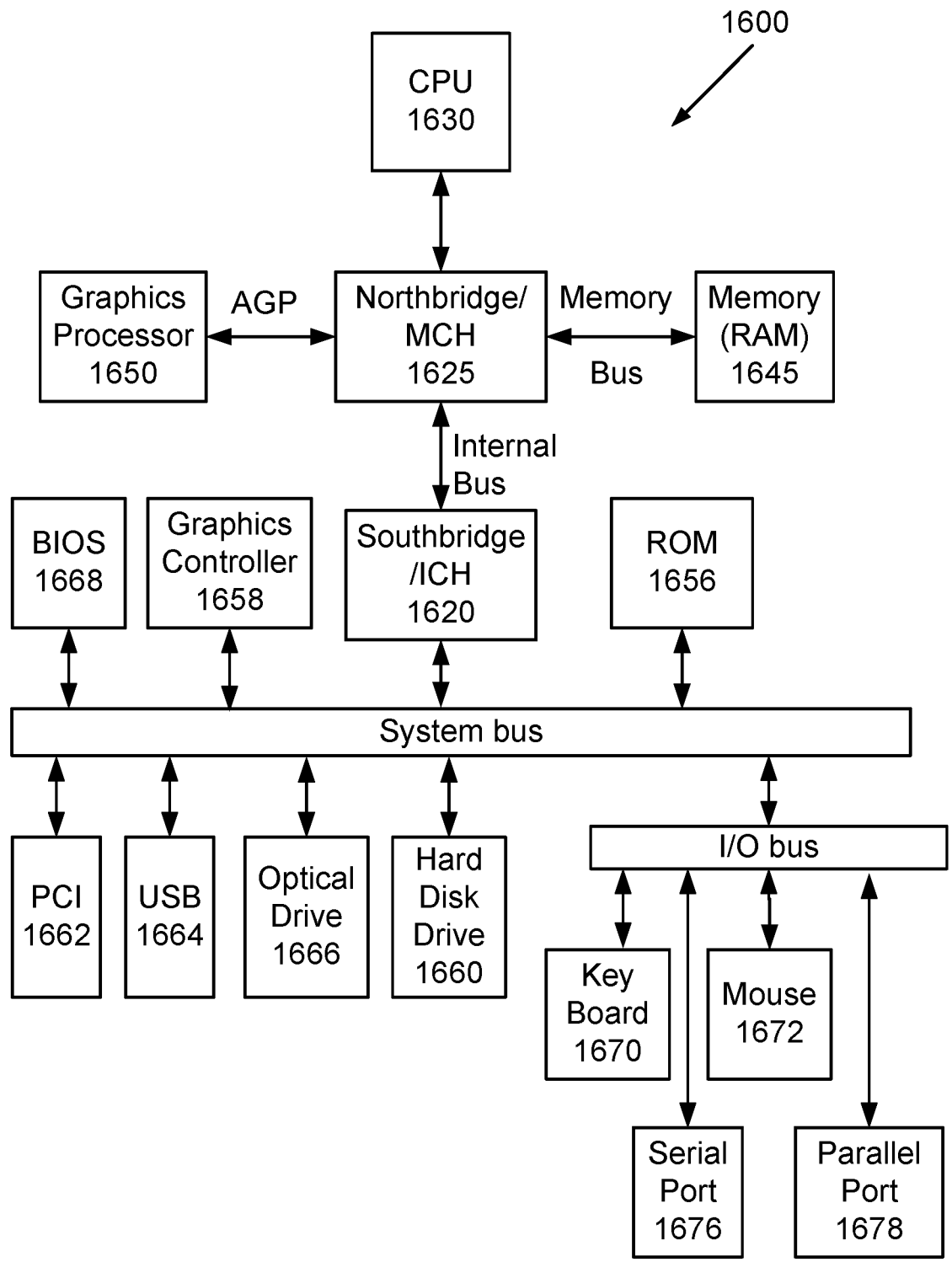
FIG. 16 is an exemplary schematic diagram of a data processing system used within the computing system, according to certain embodiments.

FIG. 16 shows a schematic diagram of a data processing system, according to certain embodiments, for performing the functions of the exemplary embodiments. The data processing system is an example of a computer in which code or instructions implementing the processes of the illustrative embodiments may be located.

In FIG. 16, data processing system 1600 employs a hub architecture including a north bridge and memory controller hub (NB/MCH) 1625 and a south bridge and input/output (I/O) controller hub (SB/ICH) 1620. The central processing unit (CPU) 1630 is connected to NB/MCH 1625. The NB/MCH 1625 also connects to the memory 1645 via a memory bus, and connects to the graphics processor 1650 via an accelerated graphics port (AGP). The NB/MCH 1625 also connects to the SB/ICH 1620 via an internal bus (e.g., a unified media interface or a direct media interface). The CPU Processing unit 1630 may contain one or more processors and even may be implemented using one or more heterogeneous processor systems.

Figure 17:
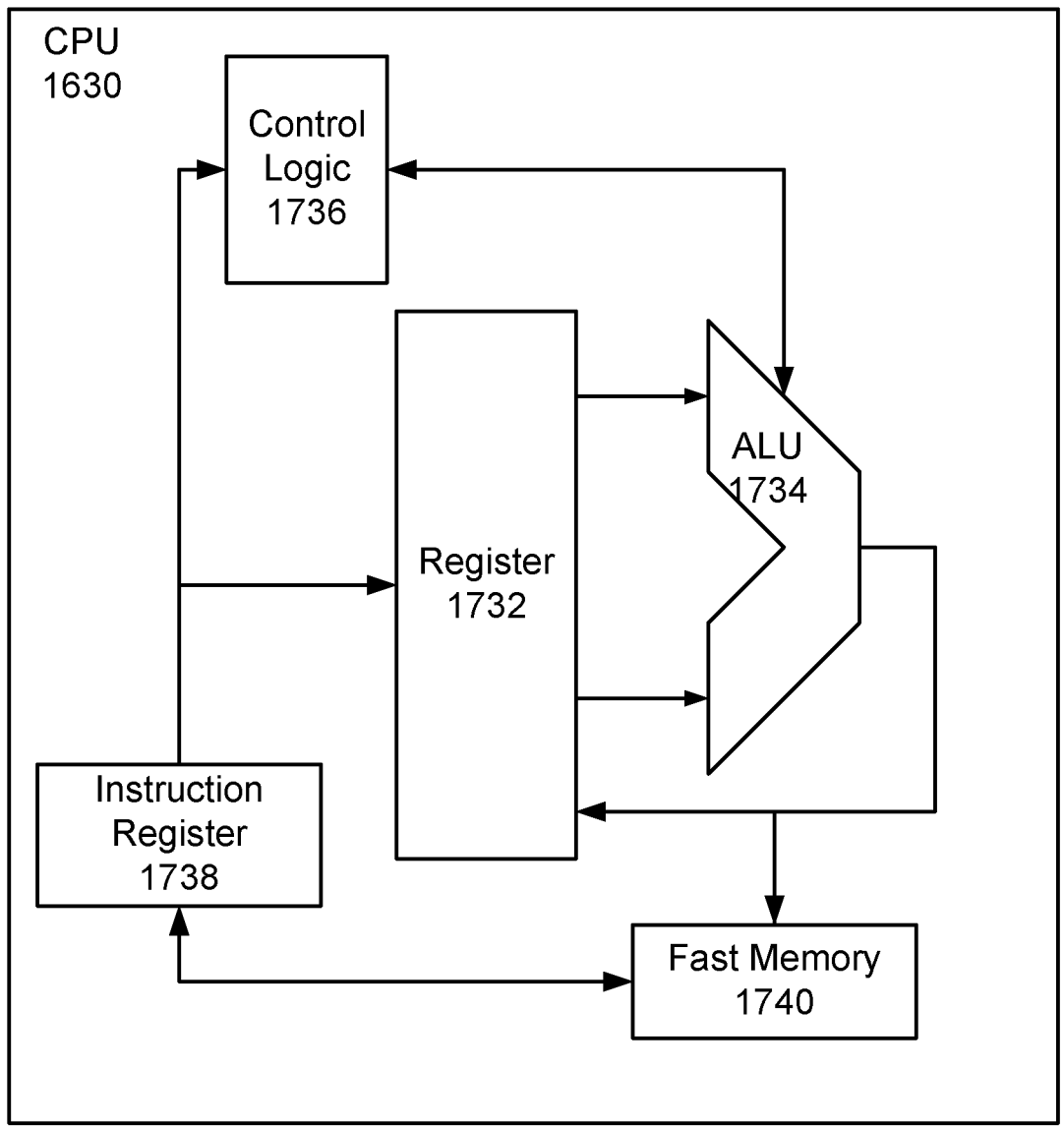
FIG. 17 is an exemplary schematic diagram of a processor used with the computing system, according to certain embodiments.

For example, FIG. 17 shows one implementation of CPU 1630. In one implementation, the instruction register 1738 retrieves instructions from the fast memory 1740. At least part of these instructions are fetched from the instruction register 1738 by the control logic 1736 and interpreted according to the instruction set architecture of the CPU 1630. Part of the instructions can also be directed to the register 1732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1734 that loads values from the register 1732 and performs logical and mathematical operations on the loaded values according to the instructions. The results from these operations can be feedback into the register and/or stored in the fast memory 1740. According to certain implementations, the instruction set architecture of the CPU 1630 can use a reduced instruction set architecture, a complex instruction set architecture, a vector processor architecture, a very large instruction word architecture. Furthermore, the CPU 1630 can be based on the Von Neuman model or the Harvard model. The CPU 1630 can be a digital signal processor, an FPGA, an ASIC, a PLA, a PLD, or a CPLD. Further, the CPU 1630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 16, the data processing system 1600 can include that the SB/ICH 1620 is coupled through a system bus to an I/O Bus, a read only memory (ROM) 1656, universal serial bus (USB) port 1664, a flash binary input/output system (BIOS) 1668, and a graphics controller 1658. PCI/PCIe devices can also be coupled to SB/ICH 1688 through a PCI bus 1662.

The PCI devices may include, for example, Ethernet adapters, add-in cards, and PC cards for notebook computers. The Hard disk drive 1660 and CD-ROM 1666 can use, for example, an integrated drive electronics (IDE) or serial advanced technology attachment (SATA) interface. In one implementation the I/O bus can include a super I/O (SIO) device.

Further, the hard disk drive (HDD) 1660 and optical drive 1666 can also be coupled to the SB/ICH 1620 through a system bus. In one implementation, a keyboard 1670, a mouse 1672, a parallel port 1678, and a serial port 1676 can be connected to the system bus through the I/O bus. Other peripherals and devices that can be connected to the SB/ICH 1620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 18:
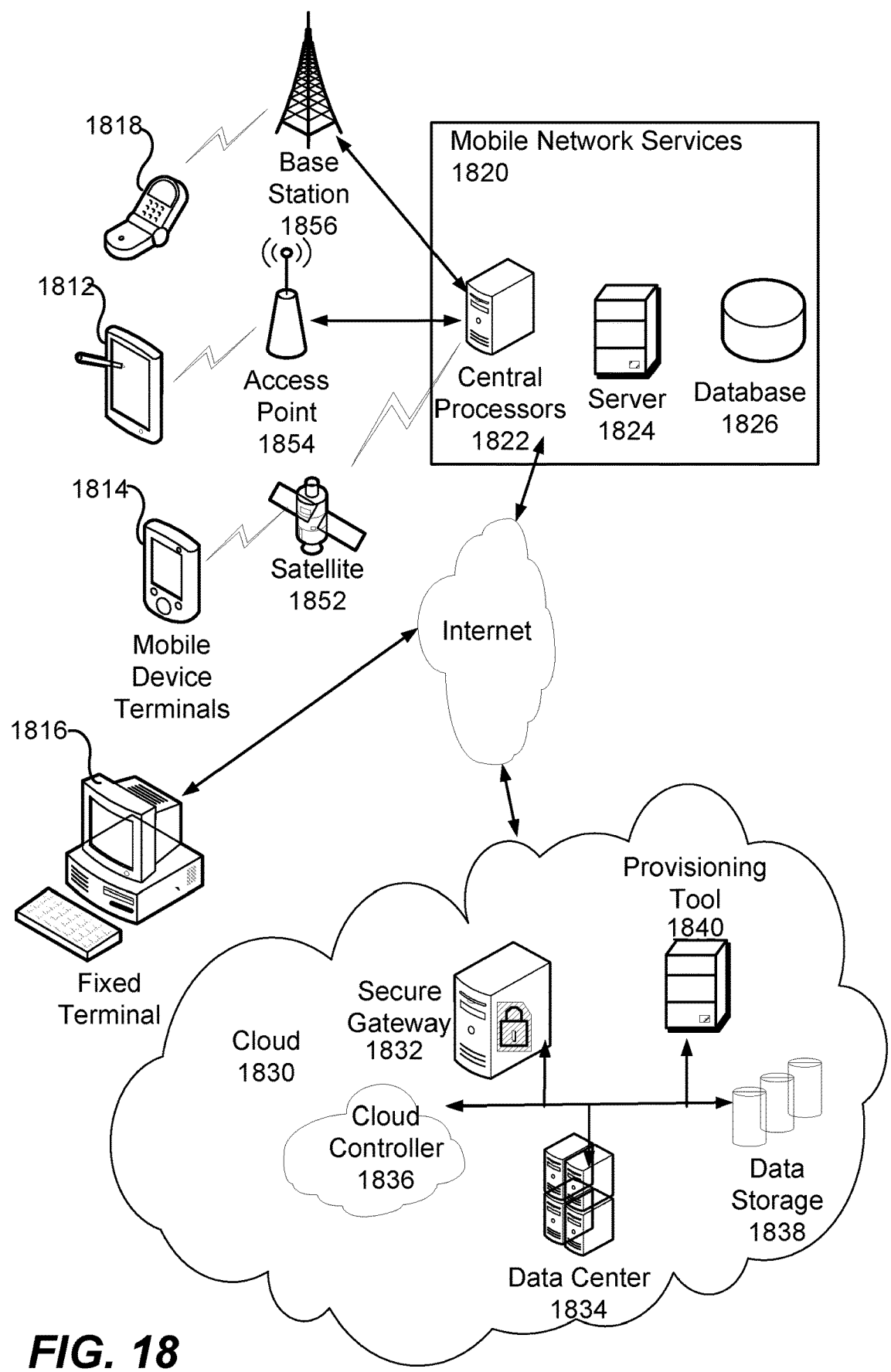
FIG. 18 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 18, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for transmission and coherent detection of data signals modulated by a plurality of overlapping chirps in a chirp spread spectrum communication system (CSS), comprising:
   an adaptive overlapping transmitter configured to receive a stream of data signals at a first data rate, the adaptive overlapping transmitter including:
      a data rate generator configured to increase the first data rate ($R_{old}$) of the data signals to a second data rate ($R_{new}$);
      an antipodal pulse converter connected in series to the data rate generator and configured to convert the data signals at the second data rate to positive and negative pulses;
      a finite impulse response (FIR) chirp generator connected in series to the antipodal pulse converter and configured to generate chirp signals from the positive and negative pulses;
      a gain amplifier connected in series to the FIR chirp generator and configured to increase the gain of the chirp signals and output a chirp modulated stream of data signals;
      a wireless antenna connected in series with the gain amplifier and configured to transmit the chirp modulated stream of data signals;
      a first computing device operatively connected to the adaptive overlapping transmitter, the first computing device including a first computer-readable medium comprising first program instructions, executable by first processing circuitry, to cause the first processing circuitry to modulate the stream of data signals by a plurality of overlapping chirps and to actuate the wireless antenna to transmit the chirp modulated stream of data signals;
      a wireless transmission circuit connected in series to the gain amplifier and configured to add three positive pulses to the chirp modulated stream of data signals to generate an encoded stream of data signals and to transmit the encoded stream;
   a receiver configured to receive the encoded stream, the receiver comprising:
      a coherent receiver to receive the encoded stream, the coherent receiver including:
         a coherent chirp matched filter configured to convolve the encoded stream of data signals with an inverted chirp signal, determine a phase and a frequency of the data signal and generate a chirp matched signal;

a fast Fourier transform circuit connected in series with the coherent chirp matched filter and configured to transform the chirp matched signal to a frequency domain;

a plurality of parallel bandpass filters connected to the Fourier transform circuit, each having a discrete frequency range and each configured to output a plurality of filtered signals in the respective discrete frequency range;

a bank of parallel integrators, wherein each integrator is operatively connected to one of the plurality of bandpass filters and configured to sum the amplitudes of the plurality of filtered signals in the discrete frequency range;

a decision circuit operatively connected to the bank of integrators and configured to match the sum of the amplitudes of the plurality of filtered signals in the discrete frequency range to a reference value to decode the encoded stream; and a second computing device having a second computer-readable medium comprising second program instructions, executable by second processing circuitry, to execute the fast Fourier Transform, control the integrators and perform calculations of the decision circuit.

2. The system of claim 1, wherein the antipodal pulse generator comprises:

an inverter configured to invert the stream of data signals at the second data rate and generate an inverted stream of data signals at the second data rate;

a first AND gate having a first and second input and a first AND output, wherein the first input is configured to receive the inverted stream of data signals at the second rate and the second input is configured to receive a pulse train;

a second AND gate in parallel with the first AND gate and having a third input and fourth input and a second AND output, wherein the third input is configured to receive the pulse train and the fourth input is configured to receive the stream of data signals at the second rate;

a first resistor connected in series with the first AND output;

a second resistor connected in series with the second AND output;

a first operational amplifier having an inverting and a non-inverting input and a gain output, wherein the inverting input is connected in series with the first resistor and the non-inverting input is connected to the second resistor;

a third resistor connected in series with the gain output and the inverting input; and a fourth resistor connected to the second resistor and the non-inverting input.

3. The system of claim 1, wherein the FIR chirp generator is further operatively configured to modulate the positive and negative pulses by increasing a modulation frequency over a duration of each pulse so that the product of the frequency and the duration equals a processing gain of 54.

4. The system of claim 1, wherein the gain amplifier is operatively configured to increase the gain of the chirp signals by a factor equal to the second data rate divided by the first data rate ($R_{new}/R_{old}$).

5. The system of claim 1, wherein the coherent chirp matched filter further comprises:

an inverted chirp signal oscillator configured to generate an inverted chirp signal;

a synchronizer configured to synchronize the inverted chirp signal with the encoded stream of data signals; and a convolution circuit configured to convolve the encoded stream of data signals with the inverted reference chirp signal to determine phase and frequency of the data signal and to generate the chirp matched signal.

6. The system of claim 1, wherein the bank of parallel integrators comprises, for each integrator:

a second operational amplifier having an inverting input, a non-inverting input and an integrator output;

a resistor connected between the output of a bandpass filter and the inverting input;

a capacitor connected in a feedback path between the integrator output and the inverting input; and a ground connection connected to the non-inverting input.

7. The system of claim 6, wherein the decision circuitry further comprises:

an input/output port;

a memory;

processing circuitry and program instructions configured to:

receive a first number, N, of the bits in the encoded stream of data signals from the input/output port;

receive a second number, M, of the chirp signals overlapping the data signals from the input/output port;

determine a plurality of threshold values based on summing each possible combination of bits in the overlapping chirp signals;

decode a first bit, $b_1$, by:

detecting and storing in the memory a first set of predecessor bits, $b_{n-1}$, $b_{n-2}$, $b_{n-3}$, equal to the second number, m, of chirp signals overlapped, wherein each predecessor bit has an amplitude equal to either +1 or −1;

summing the amplitudes of the first set of predecessor bits;

matching the output of a first integrator to a threshold value;

subtracting the sum of the amplitudes of a first set of predecessor bits from the threshold value to generate a first difference value;

storing the first difference value as a first bit of the data signal in the memory;

decode a second bit, $b_2$, by:

incrementing n by 1;

summing the amplitudes of a second set of predecessor bits, $b_1$, $b_{n-1}$ and $b_{n-2}$;

matching the output of a second integrator to a threshold value;

subtracting the sum of the amplitudes of the second set of predecessor bits from the threshold value to generate a second difference value; and storing the second difference value as a second bit of the data signal in the memory;

decode each remaining bit, $b_n$, by:

iteratively incrementing n by 1;

summing the amplitudes of the $n^{th}$ set of predecessor bits;

matching the output of an $n^{th}$ integrator to a threshold value;

subtracting the sum of the amplitudes of the $n^{th}$ set of predecessor bits from the threshold value to generate an $n^{th}$ difference value;

storing the $n^{th}$ difference value as a $n^{th}$ bit of the data signal in the memory;

continuing to decode each remaining bit until n=N; and
providing the N bits as the decoded data signal at the input/output port of the decision circuit.

8. A method for coherent detection of an encoded stream of data signals modulated by a plurality of overlapping chirps in a chirp spread spectrum communication system (CSS), comprising:
receiving, by a coherent chirp matched filter, the encoded stream of data signals, wherein the data signal comprises a first number of bits having values of either +1 or −1;
generating an inverted chirp signal;
convolving the encoded stream of data signals with the inverted chirp signal to determine phase and frequency of the data signal and to generate a chirp matched signal;
fast Fourier transforming the chirp matched signal to generate a fast Fourier transformed signal;
filtering, by a plurality of bandpass filters, the fast Fourier transformed signal, wherein each filter has a discrete frequency range, to generate a plurality of filtered signals in the respective discrete frequency range;
integrating each of the plurality of filtered signals by a one of a plurality of integrators to output a sum of the amplitudes of the plurality of filtered signals in the discrete frequency range;
decoding, by a decision circuit, each of the plurality of integrated signals to detect a bit sequence of the encoded stream of data signals.

9. The method of claim 8, further comprising:
synchronizing the inverted chirp signal with the encoded stream of data signals.

10. The method of claim 8, wherein decoding comprises:
inputting the first number, N, of the bits in the data signal to the decision circuit;
inputting a second number, M, of the chirp signals overlapped to the decision circuit;
determining a plurality of threshold values based on summing each possible combination of bits in the overlapping chirp signals;
decoding a first bit, $b_1$, by:
detecting and storing a first set of predecessor bits, $b_{n-1}$, $b_{n-2}$, $b_{n-3}$, equal to the second number, M, of chirp signals overlapped, wherein each predecessor bit has an amplitude equal to either +1 or −1;
summing the amplitudes of the first set of predecessor bits;
matching the output of a first integrator to a threshold value;
subtracting the sum of the amplitudes of a first set of predecessor bits from the threshold value to generate a first difference value; and
storing the first difference value as a first bit of the stream of data signals.

11. The method of claim 10, further comprising:
decoding a second bit, $b_2$, by:
incrementing n by 1;
summing the amplitudes of a second set of predecessor bits, $b_1$, $b_{n-1}$ and $b_{n-2}$;
matching the output of a second integrator to a threshold value;
subtracting the sum of the amplitudes of the second set of predecessor bits from the threshold value to generate a second difference value; and
storing the second difference value as a first bit of the stream of data signals.

12. The method of claim 11, further comprising:
iteratively incrementing n by 1 while n<N;
for each bit, $b_n$,
summing the amplitudes of the $n^{th}$ set of predecessor bits;
matching the output of an $n^{th}$ integrator to a threshold value;
subtracting the sum of the amplitudes of the $n^{th}$ set of predecessor bits from the threshold value to generate an $n^{th}$ difference value; and
storing the $n^{th}$ difference value as a $n^{th}$ bit of the stream of data signals.

13. The method of claim 12, further comprising:
when n=N, outputting the N bits as a decoded stream of data signals.

14. The method of claim 13, wherein the second number, m, of the chirp signals overlapped is four.

15. The method of claim 14, wherein the number of predecessor bits is three.

16. The method of claim 15, where each of the bits of the first set of predecessor bits has a value of +1 and the sum of the amplitudes of the first set of predecessor bits equals +3.

17. A method for transmitting an encoded stream of data signals modulated by a plurality of overlapping chirps in a chirp spread spectrum communication system (CSS), comprising:
receiving a stream of data signals at a first data rate ($R_{old}$);
increasing the first data rate of the data signals to a second data rate ($R_{new}$);
converting the data signals to positive and negative pulses;
generating chirp signals from the positive and negative pulses;
increasing the gain of the chirp signals by a factor equal to the ratio of the second data rate divided by the first data rate;
outputting a chirp modulated stream of data signals;
adding three positive pulses to the chirp modulated stream of data signals to generate an encoded stream of data signals; and
transmitting the encoded stream in the chirp spread spectrum communications system.

18. The method of claim 17, wherein converting the data signals to positive and negative pulses comprises:
receiving the stream of data signals at the second data rate;
inverting the stream of data signals at the second data rate to generate an inverted stream of data signals;
receiving the inverted stream of data signals at a first input of a first AND gate;
receiving a pulse train at a second input of the first AND gate and at a third input of a second AND gate;
receiving the stream of data signals at a fourth input of the second AND gate;
outputting a first AND logic comparison signal from the first AND gate;
outputting a second AND logic comparison signal from the second AND gate;
receiving the first AND logic comparison signal at an inverting input of an operational amplifier;
receiving the second AND logic comparison signal at a non-inverting input of the operational amplifier;
feeding back a gain output of the operational amplifier to the inverting input; and
outputting the positive and negative pulses at the gain output.

19. The method of claim 18, wherein generating chirp signals from the positive and negative pulses comprises increasing a modulation frequency over a duration of each pulse so that the product of the frequency and the duration equals a processing gain of 54.

20. The method of claim 19, adding the three positive pulses by concatenating the three positive pulses with the chirp modulated stream of data signals by a wireless transmission circuit.

\* \* \* \* \*